United States Patent
Sun et al.

(10) Patent No.: US 10,716,023 B2
(45) Date of Patent: Jul. 14, 2020

(54) MULTI-LEVEL SLOT FORMAT INDICATOR

(71) Applicant: QUALCOMM Incorporated, San Diego, CA (US)

(72) Inventors: Jing Sun, San Diego, CA (US); Xiaoxia Zhang, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 16/216,641

(22) Filed: Dec. 11, 2018

(65) Prior Publication Data

US 2019/0191322 A1  Jun. 20, 2019

Related U.S. Application Data

(60) Provisional application No. 62/607,758, filed on Dec. 19, 2017.

(51) Int. Cl.
*H04W 24/08* (2009.01)
*H04W 72/04* (2009.01)
(Continued)

(52) U.S. Cl.
CPC ............ *H04W 24/08* (2013.01); *H04L 5/0094* (2013.01); *H04L 5/0096* (2013.01);
(Continued)

(58) Field of Classification Search
CPC ... H04W 24/08; H04W 48/12; H04W 72/042; H04W 72/0446; H04W 74/0833;
(Continued)

(56) References Cited

U.S. PATENT DOCUMENTS

2016/0226650 A1   8/2016  Chen et al.
2018/0367289 A1*  12/2018  Kim .................... H04L 5/1469
(Continued)

OTHER PUBLICATIONS

NTT DOCOMO., et al: "Remaining Issues on Group-Common PDCCH", 3GPP Draft; R1-1718205, 3rd Generation Partnership Project (3GPP), Mobile Competence Centre, 650, Route Des Lucioles, F-06921 Sophia-Anti Polis Cedex, France, vol. RAN WG1, No. Prague, CZ; Oct. 9, 2017-Oct. 13, 2017, Oct. 8, 2017 (Oct. 8, 2017), XP051341387, 10 Pages, Retrieved from the Internet: URL: http://www.3gpp.org/ftp/Meetings_3GPP_SYNC/RAN1/Docs/ [retrieved on Oct. 8, 2017].

(Continued)

*Primary Examiner* — Duc C Ho
(74) *Attorney, Agent, or Firm* — Liem T. Do

(57) ABSTRACT

Methods, systems, and devices for wireless communications are described. A base station may transmit, and a user equipment (UE) may receive a first slot format indicator (SFI) during a first monitoring period for a set of slots associated with the first monitoring period. The base station may transmit, and the UE may receive a second SFI during a second monitoring period that is shorter in duration than the first monitoring period and occurs within the first monitoring period, the second SFI comprising an indication of slot formats for a subset of the slots associated with the second monitoring period. The base station and the UE may perform wireless communications over the subset of slots based at least in part on the first SFI and the second SFI.

30 Claims, 18 Drawing Sheets

(51) Int. Cl.
  *H04W 74/08* (2009.01)
  *H04L 5/00* (2006.01)
  *H04L 5/14* (2006.01)
  *H04W 48/12* (2009.01)

(52) U.S. Cl.
  CPC .......... *H04L 5/1469* (2013.01); *H04W 48/12* (2013.01); *H04W 72/042* (2013.01); *H04W 72/0446* (2013.01); *H04W 74/0833* (2013.01); *H04L 5/001* (2013.01)

(58) Field of Classification Search
  CPC ... H04L 5/0094; H04L 5/0096; H04L 5/1469; H04L 5/001
  See application file for complete search history.

(56) References Cited

U.S. PATENT DOCUMENTS

2019/0053227 A1* 2/2019 Huang ................ H04L 5/0094
2019/0158205 A1* 5/2019 Sheng ................ H04J 11/0076
2019/0349904 A1* 11/2019 Kwak ................ H04L 25/0238

OTHER PUBLICATIONS

International Search Report and Written Opinion—PCT/US2018/065215—ISA/EPO—dated May 9, 2019.
Qualcomm Incorporated: "Remaining Issues on Slot Format Indication," 3GPP Draft; R1-1716416_SFI_REMAINING, 3rd Generation Partnership Project (3GPP) Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339871, 11 pages, Retrieved from the Internet: URL: http://www.3gpp.org/ftp/Meetings_3GPP_SYNC/RAN1/Docs/ [retrieved on Sep. 17, 2017] the whole document.
Qualcomm Incorporated: "UE Behaviour Related to Group Common PDCCH," 3GPP Draft; R1-1713424_UE Behaviour Group Common PDCCH, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051316226, 3 pages, Retrieved from the Internet: URL: http://www.3gpp.org/ftp/Meetings_3GPP_SYNC/RAN1/Docs/ [retrieved on Aug. 20, 2017].

* cited by examiner

| SFI | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | 13 | 14 |
| 3 | D | D | D | D | D | D | D | D | D | D | D | X | D | D |
| 4 | D | D | D | D | D | D | D | D | D | D | X | X | U | U |
| 5 | D | D | D | D | D | D | D | D | D | X | X | X | 13 | 14 |
| 6 | D | D | D | D | D | D | D | D | X | X | X | X | D | D |
| 7 | D | D | D | D | D | D | D | X | X | X | X | X | U | U |
| 8 | X | X | X | X | X | X | X | X | X | X | U | 13 | 14 |
| 9 | X | X | X | X | X | X | X | X | X | U | U | D | D |
| 10 | X | U | U | U | U | U | U | U | U | U | U | U | U | U |
| 11 | X | X | U | U | U | U | U | U | U | U | U | U | 13 | 14 |
| 12 | X | X | X | U | U | U | U | U | U | U | U | U | D | D |
| 13 | X | X | X | X | U | U | U | U | U | U | U | U | U | U |
| 14 | X | X | X | X | X | U | U | U | U | U | U | U | 13 | 14 |
| 15 | X | X | X | X | X | X | U | U | U | U | U | U | D | D |
| 16 | D | X | X | X | X | X | X | X | X | X | X | X | U | U |
| 17 | D | D | X | X | X | X | X | X | X | X | X | X | 13 | 14 |
| 18 | D | D | D | X | X | X | X | X | X | X | X | X | D | D |

FIG. 4

MULTI-LEVEL SLOT FORMAT INDICATOR

CROSS REFERENCES

The present Application for Patent claims the benefit of U.S. Provisional Patent Application No. 62/607,758 by SUN et al., entitled "MULTI-LEVEL SLOT FORMAT INDICATOR," filed Dec. 19, 2017, assigned to the assignee hereof, and which is hereby expressly incorporated by reference herein in its entirety.

BACKGROUND

The following relates generally to wireless communication, and more specifically to multi-level slot format indicator (SFI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code-division multiple access (CDMA), time-division multiple access (TDMA), frequency-division multiple access (FDMA), orthogonal frequency-division multiple access (OFDMA), or discrete Fourier transform-spread-orthogonal frequency-division multiplexing (DFT-s-OFDM). A wireless multiple-access communications system may include a number of base stations or network access nodes, each simultaneously supporting communication for multiple communication devices, which may be otherwise known as user equipment (UE).

Certain wireless communications systems may support SFI signaling. Generally, the SFI may include a set of bits that indicate a format for one or more slots. The format may include whether an orthogonal frequency-division multiplexing (OFDM) symbol for a slot is configured for uplink, downlink, or unknown communications, e.g., a communication direction for the OFDM symbol. The monitoring period for the SFI (e.g., the time duration or number of slot that the SFI indication covers) is generally configured by the network, for example in a radio resource control (RRC) signal. The UE may monitor the control signal to detect the SFI and then use the indicated slot format for wireless communications during the covered slot(s). While this may be adequate in certain situations, some scenarios may present challenges, such as when the UE is unable detect the SFI indication. For example, the device may not be able to capture the medium and/or the channel may not support the transmission and therefore the device cannot communicate information, e.g., such as transmitting the SFI indication. In this instance, the UE would not know the slot format for the monitoring period.

SUMMARY

The described techniques relate to improved methods, systems, devices, or apparatuses that support a multi-level slot format indicator (SFI). Generally, the described techniques provide for multiple levels of SFI indication, where each SFI level is associated with a different monitoring period. That is, the monitoring period of the second level SFI (lower level SFI) can be a subset of (or occur within) the monitoring period for the first level SFI (higher level SFI). In some aspects, there may be several monitoring periods for the second level SFI nested within the monitoring period for the first level SFI. In some aspects, there may be monitoring period(s) for a third level SFI nested within the monitoring period of the second level SFI. Accordingly, the base station may transmit (and a user equipment (UE) may receive) multiple levels of SFIs (e.g., two SFI levels, three SFI levels, four SFI levels, etc.), with each level having its own monitoring period and where each lower SFI level has a monitoring period that is shorter in duration than, and occurs within, the monitoring period of the higher SFI level above it. The UE and the base station may perform wireless communications according to the indicated SFIs A method of wireless communication is described. The method may include receiving a first SFI during a first monitoring period for a set of slots associated with the first monitoring period, receiving a second SFI during a second monitoring period that is shorter in duration than the first monitoring period and occurs within the first monitoring period, the second SFI comprising an indication of slot formats for a subset of the slots associated with the second monitoring period, and performing wireless communications over the subset of slots based at least in part on the first SFI and the second SFI.

An apparatus for wireless communication is described. The apparatus may include means for receiving a first SFI during a first monitoring period for a set of slots associated with the first monitoring period, means for receiving a second SFI during a second monitoring period that is shorter in duration than the first monitoring period and occurs within the first monitoring period, the second SFI comprising an indication of slot formats for a subset of the slots associated with the second monitoring period, and means for performing wireless communications over the subset of slots based at least in part on the first SFI and the second SFI.

Another apparatus for wireless communication is described. The apparatus may include a processor, memory in electronic communication with the processor, and instructions stored in the memory. The instructions may be operable to cause the processor to receive a first SFI during a first monitoring period for a set of slots associated with the first monitoring period, receive a second SFI during a second monitoring period that is shorter in duration than the first monitoring period and occurs within the first monitoring period, the second SFI comprising an indication of slot formats for a subset of the slots associated with the second monitoring period, and perform wireless communications over the subset of slots based at least in part on the first SFI and the second SFI.

A non-transitory computer-readable medium for wireless communication is described. The non-transitory computer-readable medium may include instructions operable to cause a processor to receive a first SFI during a first monitoring period for a set of slots associated with the first monitoring period, receive a second SFI during a second monitoring period that is shorter in duration than the first monitoring period and occurs within the first monitoring period, the second SFI comprising an indication of slot formats for a subset of the slots associated with the second monitoring period, and perform wireless communications over the subset of slots based at least in part on the first SFI and the second SFI.

In some examples of the method, apparatus, and non-transitory computer-readable medium described above, performing the wireless communications comprises: identifying a communication direction for at least a portion of the symbols in the subset of slots based at least in part on the first SFI and the second SFI. Some examples of the method, apparatus, and non-transitory computer-readable medium described above may further include processes, features, means, or instructions for performing the wireless communications over the subset of slots based at least in part on the identified communication direction.

Some examples of the method, apparatus, and non-transitory computer-readable medium described above may further include processes, features, means, or instructions for determining that the first SFI indicates a flexible communication direction for one or more symbols within the subset of slots. Some examples of the method, apparatus, and non-transitory computer-readable medium described above may further include processes, features, means, or instructions for identifying a communication direction for each of the one or more symbols based at least in part on the second SFI.

Some examples of the method, apparatus, and non-transitory computer-readable medium described above may further include processes, features, means, or instructions the first SFI comprises control information identifying and indicating configuration information for the subset of slots, the identifying configuration information comprising identifying a slot format for the subset of slots based at least in part on the second SFI.

In some examples of the method, apparatus, and non-transitory computer-readable medium described above, the control information comprises one or more of an indication of random access channel (RACH) resources, a frame format indication, or a combination thereof.

Some examples of the method, apparatus, and non-transitory computer-readable medium described above may further include processes, features, means, or instructions for receiving a third SFI during a third monitoring period that may be shorter in duration than the second monitoring period and occurs with the second monitoring period, the third SFI comprising an indication of a slot format for a slot associated with the third monitoring period.

In some examples of the method, apparatus, and non-transitory computer-readable medium described above, the first monitoring period may be for a discovery reference signal (DRS) measurement timing configuration (DMTC) window, the second monitoring period may be for a transmission opportunity (TxOP) occurring within the DMTC window, and the third monitoring period may be for the slot occurring within the TxOP.

Some examples of the method, apparatus, and non-transitory computer-readable medium described above may further include processes, features, means, or instructions for receiving the first SFI in a first downlink control indicator (DCI) field. Some examples of the method, apparatus, and non-transitory computer-readable medium described above may further include processes, features, means, or instructions for receiving the second SFI in a second DCI field that may be different from the first DCI field.

Some examples of the method, apparatus, and non-transitory computer-readable medium described above may further include processes, features, means, or instructions for receiving the first SFI and the second SFI in a common DCI field. Some examples of the method, apparatus, and non-transitory computer-readable medium described above may further include processes, features, means, or instructions for performing at least one of joint interpretation or deconcatenation on the common DCI field to determine the first SFI, the second SFI, or a combination.

Some examples of the method, apparatus, and non-transitory computer-readable medium described above may further include processes, features, means, or instructions for receiving a configuration message indicating the first monitoring period and the second monitoring period.

In some examples of the method, apparatus, and non-transitory computer-readable medium described above, the first monitoring period may be for a TxOP and the second monitoring period may be for the one or more slots occurring within the TxOP.

In some examples of the method, apparatus, and non-transitory computer-readable medium described above, the subset of slots comprises one slot or more than one slot.

A method of wireless communication is described. The method may include transmitting a first SFI during a first monitoring period for a set of slots associated with the first monitoring period, transmitting a second SFI during a second monitoring period that is shorter in duration than the first monitoring period and occurs within the first monitoring period, the second SFI comprising an indication of slot formats for a subset of the slots associated with the second monitoring period, and performing wireless communications over the subset of slots based at least in part on the first SFI and the second SFI.

An apparatus for wireless communication is described. The apparatus may include means for transmitting a first SFI during a first monitoring period for a set of slots associated with the first monitoring period, means for transmitting a second SFI during a second monitoring period that is shorter in duration than the first monitoring period and occurs within the first monitoring period, the second SFI comprising an indication of slot formats for a subset of the slots associated with the second monitoring period, and means for performing wireless communications over the subset of slots based at least in part on the first SFI and the second SFI.

Another apparatus for wireless communication is described. The apparatus may include a processor, memory in electronic communication with the processor, and instructions stored in the memory. The instructions may be operable to cause the processor to transmit a first SFI during a first monitoring period for a set of slots associated with the first monitoring period, transmit a second SFI during a second monitoring period that is shorter in duration than the first monitoring period and occurs within the first monitoring period, the second SFI comprising an indication of slot formats for a subset of the slots associated with the second monitoring period, and perform wireless communications over the subset of slots based at least in part on the first SFI and the second SFI.

A non-transitory computer-readable medium for wireless communication is described. The non-transitory computer-readable medium may include instructions operable to cause a processor to transmit a first SFI during a first monitoring period for a set of slots associated with the first monitoring period, transmit a second SFI during a second monitoring period that is shorter in duration than the first monitoring period and occurs within the first monitoring period, the second SFI comprising an indication of slot formats for a subset of the slots associated with the second monitoring period, and perform wireless communications over the subset of slots based at least in part on the first SFI and the second SFI.

In some examples of the method, apparatus, and non-transitory computer-readable medium described above, performing the wireless communications comprises: identifying a communication direction for at least a portion of the symbols in the subset of slots based at least in part on the first SFI and the second SFI. Some examples of the method, apparatus, and non-transitory computer-readable medium described above may further include processes, features, means, or instructions for performing the wireless communications over the subset of slots based at least in part on the identified communication direction.

Some examples of the method, apparatus, and non-transitory computer-readable medium described above may further include processes, features, means, or instructions for determining that the first SFI indicates a flexible communication direction for one or more symbols within the subset of slots. Some examples of the method, apparatus, and non-transitory computer-readable medium described above may further include processes, features, means, or instructions for configuring the second SFI to indicate a communication direction for each of the one or more symbols.

Some examples of the method, apparatus, and non-transitory computer-readable medium described above may further include processes, features, means, or instructions for configuring the first SFI to comprise control information identifying and indicating configuration information for the subset of slots. Some examples of the method, apparatus, and non-transitory computer-readable medium described above may further include processes, features, means, or instructions for configuring the second SFI to indicate a slot format for the subset of slots.

Some examples of the method, apparatus, and non-transitory computer-readable medium described above may further include processes, features, means, or instructions for transmitting a third SFI during a third monitoring period that may be shorter in duration than the second monitoring period and occurs with the second monitoring period, the third SFI comprising an indication of a slot format for a slot associated with the third monitoring period.

In some examples of the method, apparatus, and non-transitory computer-readable medium described above, the first monitoring period may be for a DMTC window, the second monitoring period may be for a TxOP occurring within the DMTC window, and the third monitoring period may be for the slot occurring within the TxOP.

Some examples of the method, apparatus, and non-transitory computer-readable medium described above may further include processes, features, means, or instructions for transmitting the first SFI in a first DCI field. Some examples of the method, apparatus, and non-transitory computer-readable medium described above may further include processes, features, means, or instructions for transmitting the second SFI in a second DCI field that may be different from the first DCI field.

Some examples of the method, apparatus, and non-transitory computer-readable medium described above may further include processes, features, means, or instructions for performing at least one of joint encoding or concatenation on a common DCI field to transmit the first SFI and the second SFI. Some examples of the method, apparatus, and non-transitory computer-readable medium described above may further include processes, features, means, or instructions for transmitting the common DCI field to indicate the first SFI and the second SFI.

Some examples of the method, apparatus, and non-transitory computer-readable medium described above may further include processes, features, means, or instructions for transmitting a configuration message indicating the first monitoring period and the second monitoring period.

BRIEF DESCRIPTION OF THE DRAWINGS

FIG. 4 illustrates an example of a SFI table that supports multi-level SFI in accordance with aspects of the present disclosure.

DETAILED DESCRIPTION

Figure 1:
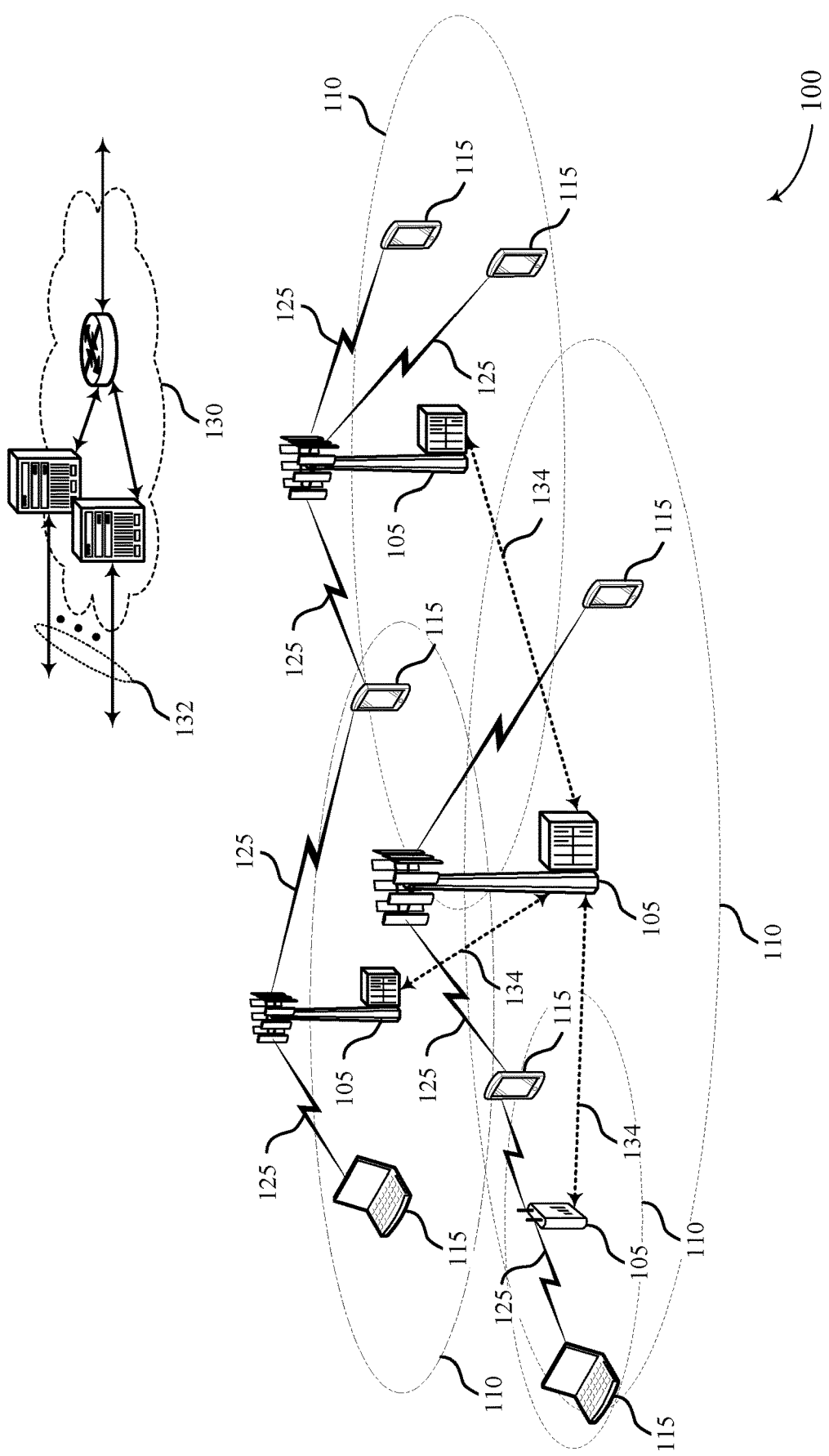
FIG. 1 illustrates an example of a wireless communications system that supports a multi-level slot format indicator (SFI) in accordance with aspects of the present disclosure.

Certain wireless communications systems may support slot format indicator (SFI) indications. The SFI may generally refer to bit(s) conveyed from the base station to a user equipment (UE) in a control signal that identifies the slot format for one or more slots. The SFI may have a monitoring period that is associated with the number of slots for which the SFI indication is applicable. The UE may receive the SFI indication and use the bits to determine the slot formats for the slot(s) within the monitoring period and then perform wireless communications with the base station according to the slot formats. Generally, slot formats may include an indication for each orthogonal frequency-division multiplexing (OFDM) symbol within the slot of whether the communications are downlink, uplink, or unknown communications. In some aspects, the UE may use the bits of the SFI indication to access an SFI table to determine the slot format. In the instance where the UE does not receive the SFI indication, the UE may not know the slot format (e.g., communication direction) to use for wireless communications.

Aspects of the disclosure are initially described in the context of a wireless communications system. Aspects of the described techniques generally provide for the use of multiple levels of SFI indications. Generally, a higher level SFI may be transmitted less frequently and cover a longer period of time and the lower level SFI may be transmitted more frequently and may be embedded in the period covered by the higher level SFI. In some aspects, the higher level SFI (or first SFI) may provide an indication of slot formats or other configuration information for a longer time period (first monitoring period) and the lower level SFI (or second SFI) may provide an indication of slot formats for the short time period (second monitoring period). More levels of SFI may also be indicated. Thus, the first SFI may provide slot format or configuration information for the first monitoring period, the second SFI may provide slot format or configuration information for the second monitoring period (that is within the first monitoring period), and so on. In some aspects, the lower level SFI may overwrite or supersede the higher layer SFI indication, e.g., due to a scheduling change at the base station. In some aspects, the lower level SFI may not overwrite or supersede the higher layer SFI, but may instead add to the format or configuration information, e.g., may assign symbols that were scheduled as unknown in the higher level SFI to downlink or uplink communications. In some aspects, the UE may be configured with how to interpret the multi-level SFI indications, e.g., via radio resource control (RRC) signaling. Accordingly, the UE and base station may then perform wireless communications based on the indicated multi-level SFIs.

Aspects of the disclosure are further illustrated by and described with reference to apparatus diagrams, system diagrams, and flowcharts that relate to multi-level SFI.

FIG. 1 illustrates an example of a wireless communications system 100 that supports a multi-level SFI in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency-division duplexing (FDD), time-division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time-division multiplexing (TDM) techniques, frequency-division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A UE 115 may receive a first SFI during a first monitoring period for a set of slots associated with the first monitoring period. The UE 115 may receive a second SFI during a second monitoring period that is shorter in duration than the first monitoring period and occurs within the first monitoring period, the second SFI comprising an indication of slot formats for a subset of the slots associated with the second monitoring period. The UE 115 may perform wireless communications over the subset of slots based at least in part on the first SFI and the second SFI.

A base station 105 may transmit a first SFI during a first monitoring period for a set of slots associated with the first monitoring period. The base station 105 may transmit a second SFI during a second monitoring period that is shorter in duration than the first monitoring period and occurs within the first monitoring period, the second SFI comprising an indication of slot formats for a subset of the slots associated with the second monitoring period. The base station 105 may perform wireless communications over the subset of slots based at least in part on the first SFI and the second SFI.

Figure 2:
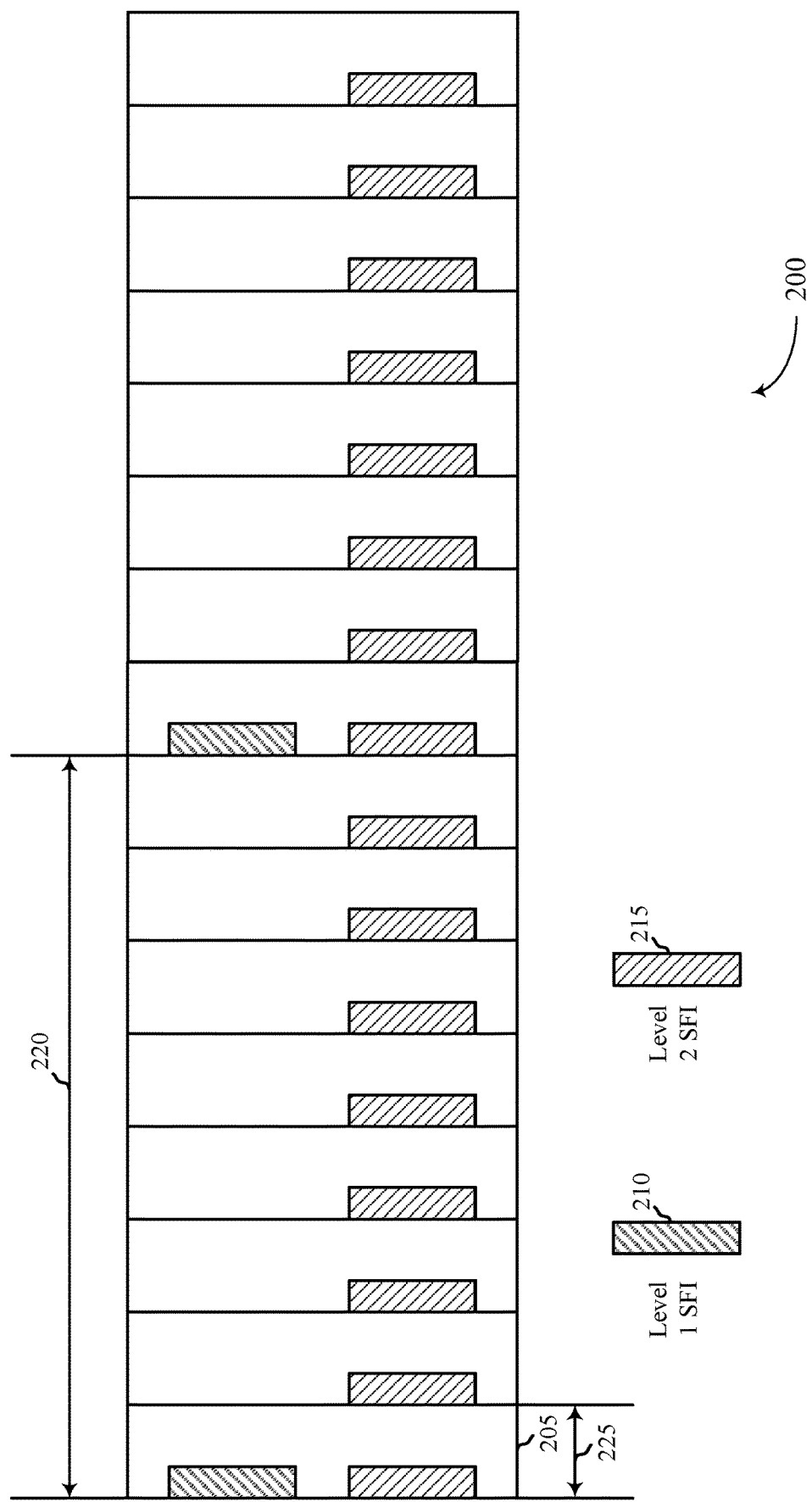
FIG. 2 illustrates an example of a SFI configuration that supports multi-level SFI in accordance with aspects of the present disclosure.

FIG. 2 illustrates an example of a SFI configuration 200 that supports multi-level SFI in accordance with aspects of the present disclosure. In some examples, SFI configuration 200 may implement aspects of wireless communications system 100. Aspects of SFI configuration 200 may be implemented by a UE and/or a base station, which may be examples of the corresponding devices described herein. Generally, SFI configuration 200 illustrates one example of a multi-level SFI indication using two SFI levels.

SFI configuration 200 includes a plurality of slots 205, with 16 slots 205 being shown by way of example only. SFI configuration 200 may support more slots 205 or less slots 205. Moreover, it is to be understood that the slots 205 are illustrated as one example of time periods described with respect to monitoring periods. However, the described monitoring periods are not limited to slots 205, but may instead cover other time periods, such as one or more subframes, one or more frames, etc. Moreover, the described monitoring periods may be associated with other defined time periods, such as transmission opportunity (TxOP) time period(s), discovery reference signal (DRS) measurement timing configuration (DMTC) window(s), etc.

SFI configuration 200 may include one or more instances of a first SFI 210 and a second SFI 215. The first SFI 210 may be considered, at least with respect to the second SFI 215, a higher level SFI, e.g., a level 1 SFI. The second SFI 215 may be considered, at least with respect to the first SFI 210, a lower level SFI, e.g., a level 2 SFI. Generally, the first SFI 210 and second SFI 215 may be transmitted from the base station to a UE in a control signal, such as a group common physical downlink control channel (GC-PDCCH) signal. In some aspects, the first SFI 210 and second SFI 215 are transmitted or otherwise conveyed as bit(s) in a downlink control indicator (DCI) of the control signal. As is explained with respect to FIG. 5, the first SFI 210 and second SFI 215 may be conveyed separately in one or more DCIs or may be combined in a DCI, e.g., using joint encoding, concatenation, or some other combining technique. Generally, the first SFI 210 and the second SFI 215 may be conveyed during an initial period of the slot 205.

In some aspects, the first SFI 210 has or is otherwise associated with a first monitoring period 220 and the second SFI 215 has or is otherwise associated with a second monitoring period 225. The first monitoring period 220 may be associated with a time duration that is longer than the second monitoring period 225. Accordingly, the second monitoring period 225 has a duration that is shorter than, and occurs within the first monitoring period 220. In the example SFI configuration 200, the first monitoring period 220 has a duration that spans eight slots 205 and the second monitoring period 225 has a duration that spans one slot 205. However, the first monitoring period 220 may span more or fewer slots 205 (or subframes, frames, etc.) and the second monitoring period 225 may span more or fewer slots 205 (or subframes, frames, etc.). Thus, there may be multiple instances of the second monitoring period 225 that occur within the first monitoring period 220. In one non-limiting example, the first monitoring period 220 may be associated with a TxOP and the second monitoring period 225 may be associated with slot(s) 205 occurring with the TxOP.

In some aspects, the length or duration of the first monitoring period 220 and/or the second monitoring period 225 may be configured by the base station and signaled to the UE in a configuration signal, such as an RRC signal. In some aspects, the length or duration of the first monitoring period 220 and/or the second monitoring period 225 may be preconfigured for the base station and the UE. The length or duration of the first monitoring period 220 and/or the second monitoring period 225 may be fixed and/or may be dynamically changed. Moreover, the number of instances of the second monitoring period 225 that occur within the first monitoring period 220 may be changed, e.g., may be changed to span two slots 205, four slots 205, etc., that occur within the first monitoring period 220.

In some aspects, the first SFI 210 may carry or otherwise convey an indication of certain control information for the slots 205 occurring within the first monitoring period 220. In some aspects, the control information indicated in the first SFI 210 may include more generic configurations, such as information on where the UE might perform random access channel (RACH) procedures, where the base station will transmit certain information, frame format information, and the like. That is, in some aspects, the first SFI 210 may define the structure of the first monitoring period 220 by reusing the SFI mechanism to indicate the more generic configuration information. In some aspects, the control information indicated in the first SFI 210 may include a slot pattern that the UE is to use for wireless communications. For example, the first SFI 210 may indicate that the first three slots 205 are for downlink (D) communications, the next three slots 205 are for uplink (U) communication, and the last two slots 205 are unknown (X), or some other pattern. This may provide a high level indication of the format for the slots 205, without specifically designating the communication direction for particular symbol periods within the slots 205. In some aspects, the control information indicated in the first SFI 210 may be the actual slot formats for the slots 205 occurring within the first monitoring period 220, e.g., may identify the communication direction for each symbol period of the slots 205 within the first monitoring period 220.

In some aspects, the second SFI 215 may carry or otherwise convey an indication of certain control information for the slots 205 occurring within the second monitoring period 225. In some aspects, the control information indicated in the second SFI 215 may include slot formats for a subset of slots 205 occurring with the second monitoring period 225. In the example shown in SFI configuration 200, the subset of slots occurring within the second monitoring period 225 includes one slot 205. However, in other examples the second monitoring period 225 may span more than one slot 205 and therefore the second SFI 215 may indicate the slot format for those slots 205. For example, the second SFI 215 may indicate the communication direction for each symbol period of the slots 205 that are covered by the second monitoring period 225, e.g., indicate which symbols are for downlink (D) communications, which symbol periods are for uplink (U) communication, and which symbol periods are for unknown (X) communications.

Thus, the base station may transmit (and the UE may receive) the first SFI 210 and the second SFI 215 and use the indicated information (or information derivable from) to perform wireless communications during the second monitoring period 225. This may include the UE identifying the communication direction for the symbols in the slots 205 of the second monitoring period 225. In some aspects, the UE may determine that the first SFI indicates an unknown (X) communication direction for certain symbols and use the second SFI 215 to identify the communication direction (e.g., downlink (D) or uplink (U)) for those symbols. That is, the unknown (X) communication direction may be a flexible communication direction. The second SFI 215 may not overwrite the information indicated in the first SFI 210, but may instead be used to further define higher level unknown (X) decisions. However, in other examples the UE may determine that the information indicated in the second SFI 215 overwrites the information indicated in the first SFI 210, e.g., due to a change in communication requirements of the base station. For example, the base station may receive higher priority, lower latency, etc., data for communications after transmitting the first SFI 210 and may therefore include information (e.g., bit(s)) in the second SFI 215 indicating that the UE is to overwrite the first SFI 210 with the second SFI 215. In some aspects, the UE may resolve conflicts between the first SFI 210 and the second SFI 215 based on the type of communications being performed during the second monitoring period 225, based on channel conditions, or some other metrics that may occur or change since the time between the first SFI 210 being received and the second SFI 215 being received.

In some aspects, the UE is configured to monitor two or more levels of SFI. The higher level SFI (the first SFI 210) may be transmitted less frequently and covers a longer period of time. In some aspects, the highest level SFI may not indicate the actual slot format, but may reuse the defined SFI mechanism to indicate more generic configuration information. The lower level SFI (the second SFI 215) may be transmitted more frequently and is embedded in the period covered by higher level SFI. In some aspects, the transmissions of the first SFI 210 and/or second SFI 215 may not always be periodic. For example, the TxOP level SFI transmission timing may be irregular, e.g., based on the results of an LBT procedure.

In some aspects, the first SFI 210 may be aligned with or replace the semi-static DL/UL assignment period and provide more dynamic control of the resource directions. The second SFI 215 may be at the multi-slot level or per-slot level. In one example illustrated in FIG. 3, the second SFI 215 may be transmitted at the multi-slot level and another level 3 may be transmitted at the slot level. The monitoring period configuration maybe periodic for licensed case, as the base station has full control of the resources. For a mmW scenario, the first SFI 210 transmission may share the remaining minimum system information (RMSI) physical downlink control channel (PDCCH) transmission to share the beam sweeping resources.

Figure 3:
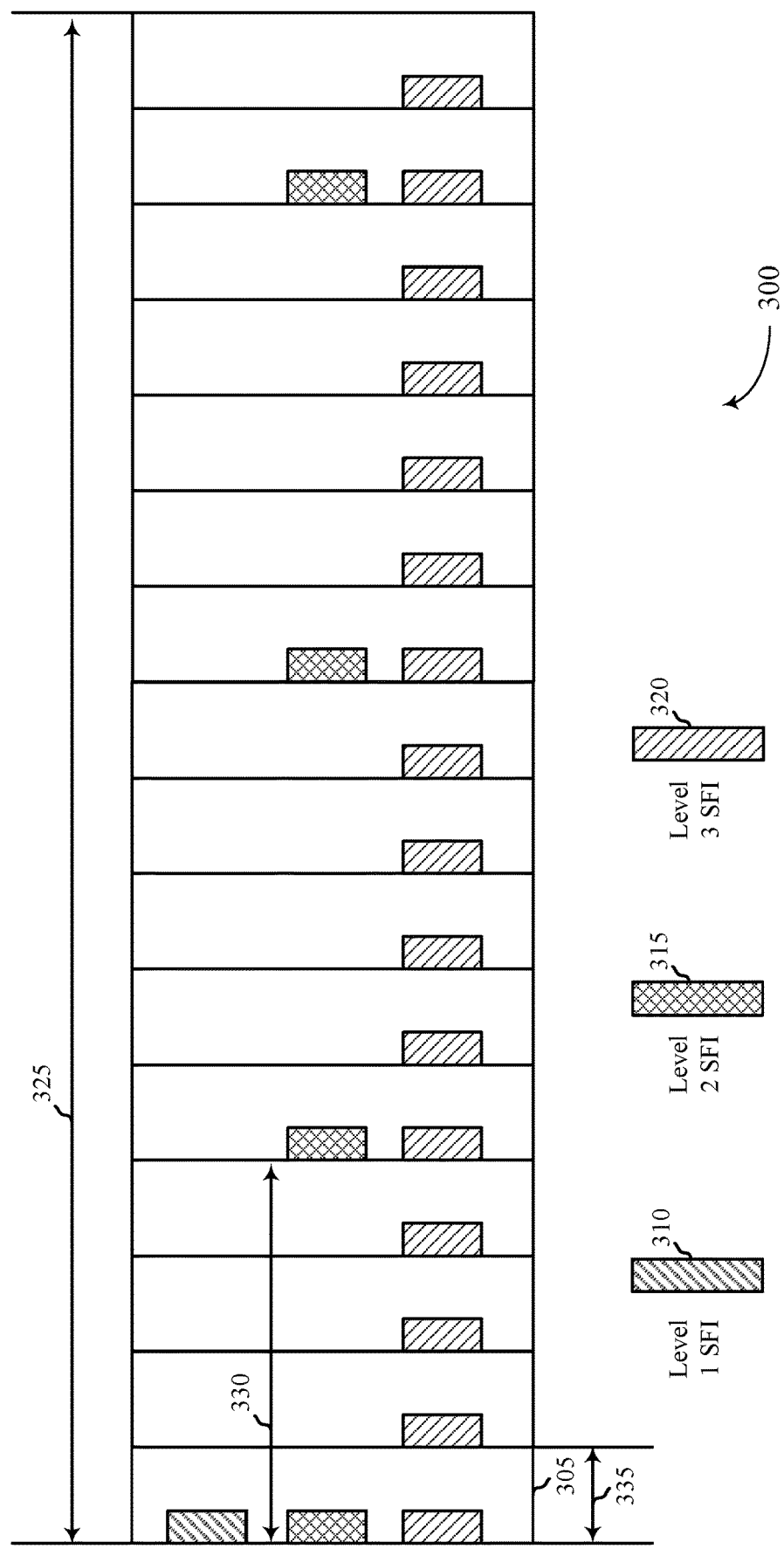
FIG. 3 illustrates an example of a SFI configuration that supports multi-level SFI in accordance with aspects of the present disclosure.

FIG. 3 illustrates an example of a SFI configuration 300 that supports multi-level SFI in accordance with aspects of the present disclosure. In some examples, SFI configuration 300 may implement aspects of wireless communications system 100 and/or SFI configuration 200. Aspects of SFI configuration 300 may be implemented by a UE and/or a base station, which may be examples of the corresponding devices described herein. Generally, SFI configuration 300 illustrates one example of a multi-level SFI indication using three SFI levels.

SFI configuration 300 includes a plurality of slots 305, with 16 slots 305 being shown by way of example only. SFI configuration 300 may support more slots 305 or less slots 305. As discussed above, it is to be understood that the slots 305 are illustrated as one example of time periods described with respect to monitoring periods, but the described monitoring periods are not limited to slots 305, but may instead cover other time periods, such as one or more subframes, one or more frames, etc.

SFI configuration 300 may include one or more instances of a first SFI 310, a second SFI 315, and a third SFI 320. The first SFI 310 may be considered, at least with respect to the second SFI 315 and the third SFI 320, a higher level SFI, e.g., a level 1 SFI. The second SFI 315 may be considered, at least with respect to the first SFI 310, a lower level SFI, e.g., a level 2 SFI. The third SFI 320 may be considered, at least with respect to the first SFI 310 and the second SFI 315, a lower level SFI, e.g., a level 3 SFI. Generally, the first SFI 310, the second SFI 315, and the third SFI 320 may be transmitted from the base station to a UE in a control signal, such as a GC-PDCCH signal. In some aspects, the first SFI 310, the second SFI 315, and the third SFI 320 are transmitted or otherwise conveyed as bit(s) in a DCI of the control signal. The first SFI 310, the second SFI 315, and the third SFI 320 may be conveyed separately in one or more DCIs or may be combined in a DCI. Generally, the first SFI 310, the second SFI 315, and the third SFI 320 may be conveyed during an initial period of the slot 305.

In some aspects, the first SFI 310 has or is otherwise associated with a first monitoring period 325. The second SFI 315 has or is otherwise associated with a second monitoring period 330. The third SFI 320 has or is associated with a third monitoring period 335. The first monitoring period 325 may be associated with a time duration that is longer than the second monitoring period 330 and the third monitoring period 335. Accordingly, the second monitoring period 330 and the third monitoring period 335 have durations that are shorter than, and occurs within the first monitoring period 325. The second monitoring period 330 may be associated with a time duration that is longer than the third monitoring period 335. Accordingly, the third monitoring period 335 has a duration that are shorter than, and occurs within the second monitoring period 330. In the example SFI configuration 300, the first monitoring period 325 has a duration that spans 16 slots 305, the second monitoring period 330 has a duration that spans four slot 305, and the third monitoring period has a duration that spans one slot 305. However, the first monitoring period 325, second monitoring period 330, and/or third monitoring period 335 may span more or fewer slots 305 (or subframes, frames, etc.). Thus, there may be multiple instances of the second monitoring period 330 that occur within the first monitoring period 325 and multiple instances of the third monitoring period 335 that occur within the second monitoring period 330. In one non-limiting example, the first monitoring period 325 may be associated with a DMTC window, the second monitoring period 330 may be associated with TxOPs occurring with the DMTC window, and the third monitoring period 335 may be associated with slot(s) 305 occurring with the TxOP.

In some aspects, the length or duration of the first monitoring period 325, the second monitoring period 330, and/or the third monitoring period 335 may be configured by the base station and signaled to the UE in a configuration signal, such as an RRC signal. In some aspects, the length or duration may be preconfigured for the base station and the UE. The length or duration may be fixed and/or may be dynamically changed. Moreover, the number of instances of the second monitoring period 330 that occur within the first monitoring period 325 and/or the third monitoring period 335 that occur with the second monitoring period 330 may be changed.

In some aspects, the first SFI 310 may carry or otherwise convey an indication of certain control information for the slots 305 occurring within the first monitoring period 325. In some aspects, the control information indicated in the first SFI 310 may include more generic configurations, such as information on where the UE might perform RACH procedures, where the base station will transmit certain information, frame format information, and the like. That is, in some aspects, the first SFI 310 may define the structure of the first monitoring period 325 by reusing the SFI mechanism to indicate the more generic configuration information. In some aspects, the control information indicated in the first SFI 310 may include a slot pattern that the UE is to use for wireless communications. For example, the first SFI 310 may indicate that the first eight slots 305 are for downlink (D) communications and the next eight slots 305 are for uplink (U) communication, or some other pattern. This may provide a high level indication of the format for the slots 305, without specifically designating the communication direction for particular symbol periods within the slots 305. In some aspects, the control information indicated in the first SFI 310 may be the actual slot formats for the slots 305 occurring within the first monitoring period 325, e.g., may identify the communication direction for each symbol period of the slots 305 within the first monitoring period 325.

In some aspects, the second SFI 315 may carry or otherwise convey an indication of certain control information for the slots 305 occurring within the second monitoring period 330. In some aspects, the control information indicated in the second SFI 315 may include slot formats for a subset of slots 305 occurring with the second monitoring period 330. In the example shown in SFI configuration 300, the subset of slots occurring within the second monitoring period 330 includes four slots 305. However, in other examples the second monitoring period 330 may span more or less slots 305 and therefore the second SFI 315 may indicate the slot format for those slots 305. For example, the second SFI 315 may indicate the communication direction for each symbol period of the slots 305 that are covered by the second monitoring period 330, e.g., indicate which symbols are for downlink (D) communications, which symbol periods are for uplink (U) communication, and which symbol periods are for unknown (X) communications.

In some aspects, the third SFI 320 may carry or otherwise convey an indication of certain control information for the slots 305 occurring within the third monitoring period 335. In some aspects, the control information indicated in the third SFI 320 may include slot formats for a subset of slots 305 occurring with the third monitoring period 335. In the example shown in SFI configuration 300, the subset of slots occurring within the third monitoring period 335 includes one slot 305. However, in other examples the third monitoring period 335 may span more than one slot 305 and therefore the third SFI 320 may indicate the slot format for those slots 305. For example, the third SFI 320 may indicate the communication direction for each symbol period of the slots 305 that are covered by the third monitoring period 335, e.g., indicate which symbols are for downlink (D) communications, which symbol periods are for uplink (U) communication, and which symbol periods are for unknown (X) communications.

Thus, the base station may transmit (and the UE may receive) the first SFI 310, the second SFI 315, and the third SFI 320 and use the indicated information (or information derivable from) to perform wireless communications during the third monitoring period 335. This may include the UE identifying the communication direction for the symbols in the slots 305 of the third monitoring period 335. In some aspects, the UE may determine that the first SFI 310 and/or the second SFI 315 indicates an unknown (X) communication direction (i.e., a flexible communication direction) for certain symbols and use the third SFI 320 to identify the communication direction (e.g., downlink (D) or uplink (U)) for those symbols).

In some aspects, the first SFI 310 (e.g., the Level 1 SFI) may be at the DMTC window level. This period can naturally be a DRS cycle in NR-SS (e.g., the transmission may share a DRS transmission burst and therefore avoid a separate LBT procedure). The first SFI 310 may define the structure of a DMTC window, e.g., not in the sense of DL/UL for each slot 305, as the traffic may not be known at this time. However, the first SFI 310 may carries information on where to RACH, where the base station will likely transmit, e.g., a frame format, but maybe not detailed information about the slot. The second SFI 315 (e.g., the level 2 SFI) may be at the TxOP level and be transmitted at the beginning of an TxOP and define the structure of the TxOP, e.g., how many slots are DL-centric, how many slots are UL-centric, etc. The third SFI 320 (e.g., the level 3 SFI) may be at the slot level within TxOP.

It is to be understood that the described techniques are not limited to the SFI levels described herein. Instead, other combinations of the slot levels may be utilized that may not use all of the SFI levels. The first SFI 310 and second SFI 315 may be used in one example. The second SFI 315 and the third SFI 320 may be used in another example. The first SFI 310 and the third SFI 320 may be used in another example. Another example may combine use of the first SFI 310, the second SFI 315, and the third SFI 320.

FIG. 4 illustrates an example of a SFI table 400 that supports multi-level SFI in accordance with aspects of the present disclosure. In some examples, SFI table 400 may implement aspects of wireless communications system 100 and/or slot configurations 200/300. Aspects of SFI table 400 may be implemented by a UE and/or base station, which may be examples of the corresponding devices described herein.

Generally, SFI table 400 may be signaled and/or preconfigured for the base station and UE. The SFI table 400 may include a plurality of rows 405 and columns 410. The first row 405 is a header row that identifies the entries in the corresponding columns 410. The first column 410 identifies the particular SFI. For example, the first row 405 identifies the first column 410 as corresponding to the SFI indication and the remaining columns 410 correspond to the symbols of a slot, e.g., the second column 410 corresponds to symbol 1 of the slot, the third column 410 corresponds to symbol 2 of the slot, and so on. Accordingly, the second row 405 through the last row 405 generally indicate the slot format. It is to be understood that the number of symbols in the SFI table 400 are not limited to fourteen symbols and, instead, may include more or fewer symbols. It is also to be understood that SFI table 400 may include more or fewer rows 405.

The second and following rows 405 generally corresponds to a particular SFI indication. As discussed herein, the SFI may be indicated in one or more bits of a DCI, for example, in two bits, three bits, four bits, or some other number of bits that are conveyed in the DCI. This, a four bit pattern of 0011 may indicate SFI 3, which corresponds to the fifth row 405 in the SFI table 400. The fifth row 405 of the SFI table 400 may have a generally downlink (D) centric slot format, e.g., symbols 1-11 are downlink (D) symbols, symbol 12 is an unknown (X) symbol, and symbols 13 and 14 are downlink (D) symbols.

As another example, a five bit pattern SFI indication of 01001 may indicate SFI 9, which corresponds to the 11th row in the SFI table 400. The 11th row in the SFI table 400 is generally an unknown (X) centric slot format, e.g., symbols 1-10 are unknown (X) symbols, symbols 11 and 12 are uplink (U) symbols, and symbols 13 and 14 are downlink (D) symbols.

In some aspects, different UEs may be configured with different sets of available SFIs. For example, a first UE may be configured with SFIs 1-8, a second UE may be configured with SFIs 9-16, and so on. Accordingly, a four bit SFI indication of 0110 to the second UE may indicate that the UE is to use the slot format corresponding to SFI 14 of SFI table 400, whereas the same four bit SFI indication of 0110 to the first UE may indicate that the UE is to use the slot format corresponding to SFI 6 of SFI table.

As discussed, the base station may generally transmit (and the UE may receive) first and second SFI indications. In some aspects, the first SFI may indicate control information, such as general configuration information, e.g., frame format, grant information, etc., for the corresponding first monitoring period and the second SFI may indicate control information, such as an entry corresponding to row(s) 405 of SFI table 400.

Figure 5:
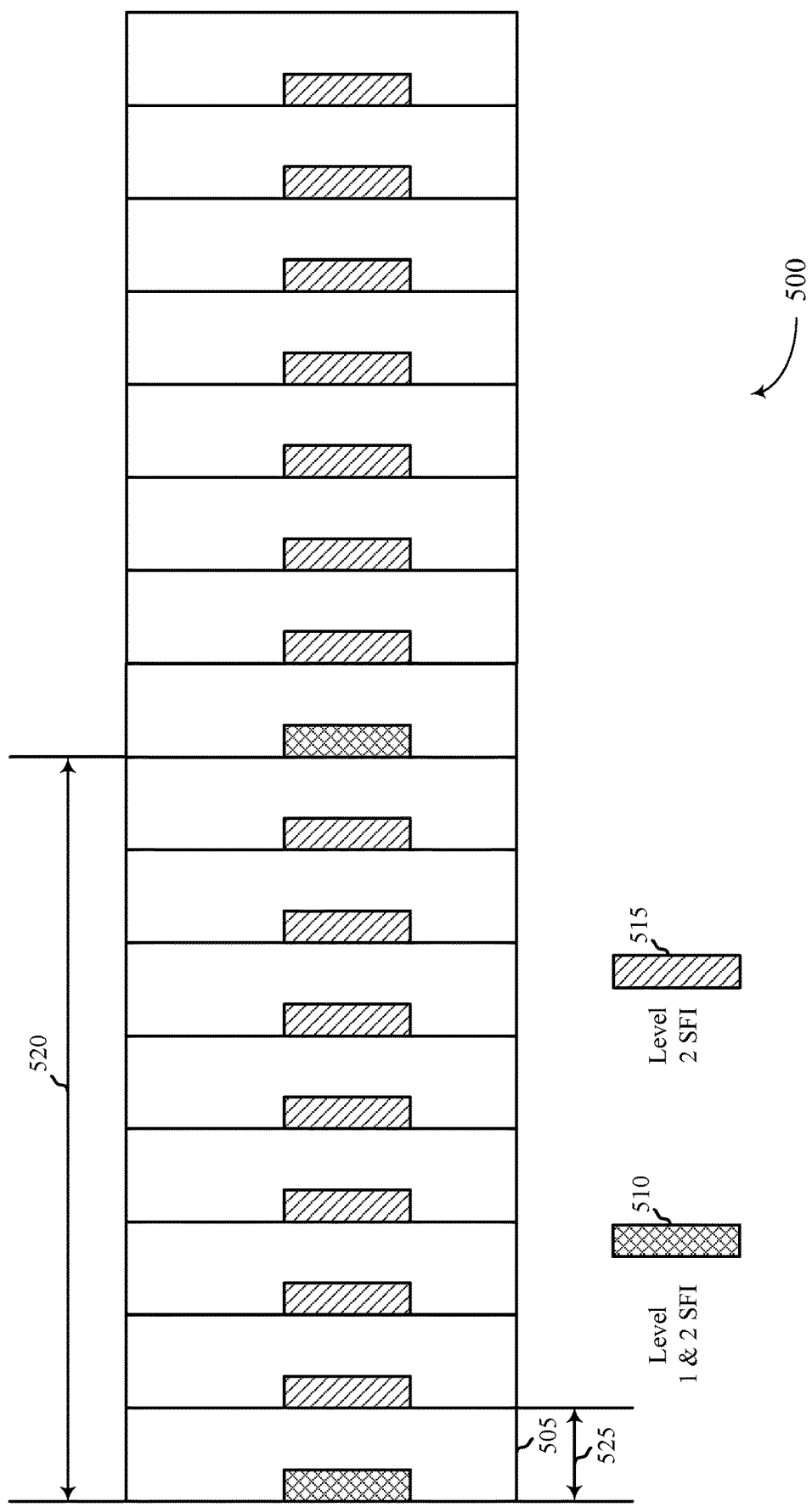
FIG. 5 illustrates an example of a SFI configuration that supports multi-level SFI in accordance with aspects of the present disclosure.

FIG. 5 illustrates an example of a SFI configuration 500 that supports multi-level SFI in accordance with aspects of the present disclosure. In some examples, SFI configuration 500 may implement aspects of wireless communications system 100, slot configurations 200/300, and/or SFI table 400. Aspects of SFI configuration 500 may be implemented by a UE and/or a base station, which may be examples of the corresponding devices described herein. Generally, SFI configuration 500 illustrates one example of a multi-level SFI indication where the SFIs are indicated in a combined DCI.

SFI configuration 500 includes a plurality of slots 505, with 16 slots 505 being shown by way of example only. SFI configuration 500 may support more slots 505 or less slots 505. As discussed above, it is to be understood that the slots 505 are illustrated as one example of time periods described with respect to monitoring periods, but the described monitoring periods are not limited to slots 505, but may instead cover other time periods, such as one or more subframes, one or more frames, etc.

SFI configuration 500 may include one or more instances of a combined SFI 510 and a second SFI 515. The combined SFI 510 may generally include a first SFI that may be considered, at least with respect to the second SFI 515, a higher level SFI, e.g., a level 1 SFI. The second SFI 515 may be considered, at least with respect to the first SFI, a lower level SFI, e.g., a level 2 SFI. Generally, the combined SFI 510 (including one instance of the first SFI and one instance of the second SFI 515) and subsequent instances of the second SFI 515 occurring within the first monitoring period 520 may be transmitted from the base station to a UE in a control signal, such as a GC-PDCCH signal. In some aspects, the combined SFI 510 (including the first SFI) and the second SFI 515 are transmitted or otherwise conveyed as bit(s) in a DCI of the control signal. In some aspects, the first SFI has or is otherwise associated with a first monitoring period 520 and the second SFI 515 has or is otherwise associated with a second monitoring period 525.

In some aspects, the combined SFI 510 may jointly indicate a first SFI (e.g., a level 1 SFI) and one instance of the second SFI 515. For example, the first SFI and the second SFI 515 may be combined in any fashion to as to be signaled together. For example, the first SFI and the second SFI 515 may be jointly encoded by the base station, may be concatenated by the base station, or any other combining technique may be used by the base station to combine the first SFI and the second SFI 515 to be indicated in a single DCI (e.g., within one set of bits in the DCI). The UE may be configured to separate the first SFI and the second SFI 515 in the slot 505 that contains the combined SFI 510. For example, the UE may use joint decoding techniques (e.g., joint interpretation), reverse concatenation techniques (i.e., deconcatenation), or any techniques to separate the first SFI and the second SFI 515 in the combined SFI 510.

In some aspects, for a slot/coreset that two levels of SFI that the UE is configured to monitor, one scenario may use separate DCIs (such as is shown in FIGS. 2 and 3). The use of separate DCIs for the two SFIs may imply separate decoding, e.g., use of the same DCI format for each SFI in each level. Another scenario may use joint DCI (such as is shown in FIG. 5). Using a joint DCI may imply single decoding, e.g., combine the two SFIs into one DCI, by concatenation or by joint encoding or by some other combining means. This may imply a dynamic (e.g., but known) length of the DCI. The joint DCI may use the same radio network temporary identifier (RNTI) for the SFIs.

In some aspects, the monitoring for each level of SFI monitoring may be RRC configured by the base station. Different periodicities may configured for different levels of SFIs. The different levels of SFI may have different payload size, e.g., different DCI payload sized. The RNTI used by the different levels of SFI may be different as well.

Figure 6:
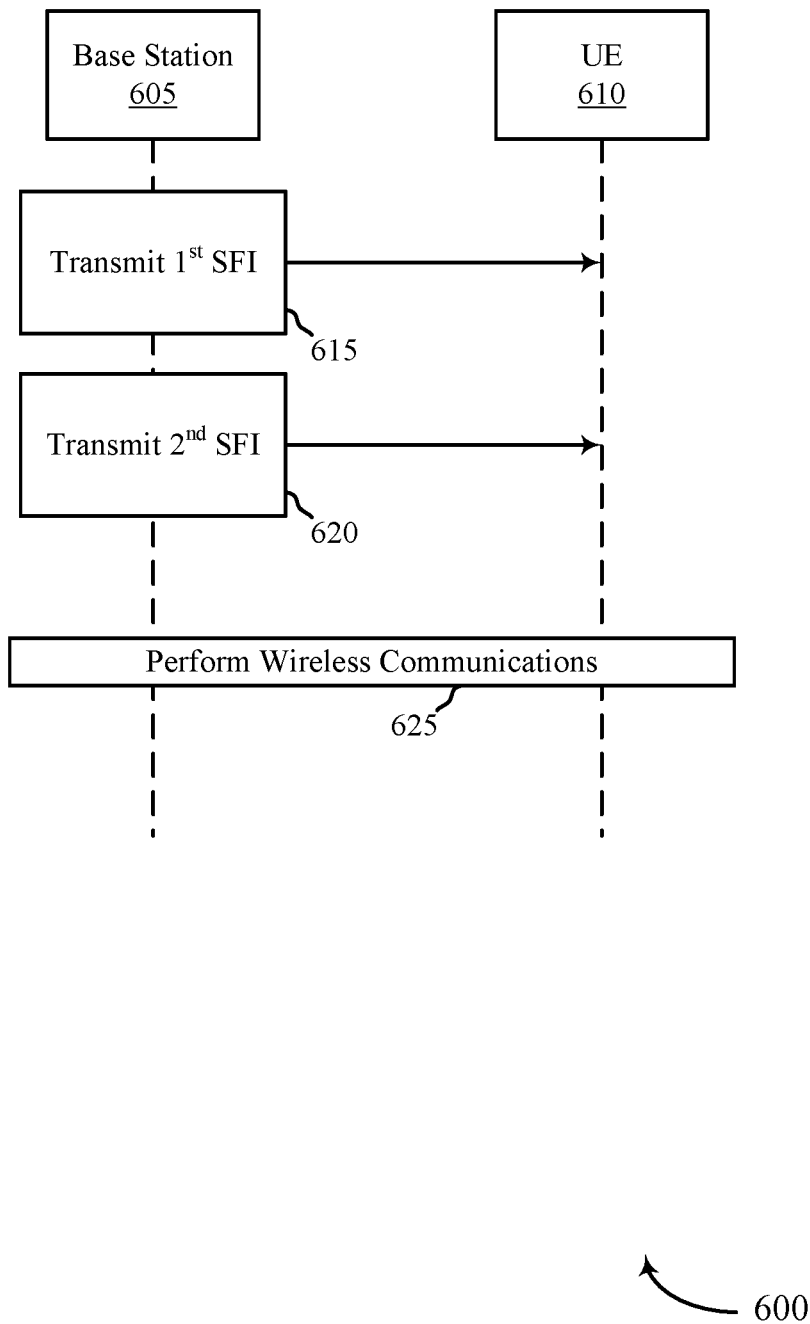
FIG. 6 illustrates an example of a process that supports multi-level SFI in accordance with aspects of the present disclosure.

FIG. 6 illustrates an example of a process 600 that supports multi-level SFI in accordance with aspects of the present disclosure. In some examples, process 600 may implement aspects of wireless communications system 100, slot configurations 200/300/500, and/or SFI table 400. Process 600 may include a base station 605 and a UE 610, which may be examples of the corresponding devices described herein.

At 615, base station 605 may transmit (and UE 610 may receive) a first SFI during a first monitoring period for a set of slots associated with the first monitoring period. The first SFI may indicate control information that identifies configuration information for the set of slots and/or the subset of slots. The control information may include RACH resource(s), frame format, grant information, and the like, for the set of slots. In this instance, UE 610 may use the second SFI to identify the slot format for the subset of slots.

At 620, base station 605 may transmit (and UE 610 may receive) a second SFI during a second monitoring period. The second monitoring period may be shorter in duration than the first monitoring period. The second monitoring period may occur within the first monitoring period. The second SFI may indicate slot formats for a subset of the slots associated with the second monitoring period.

At 625, base station 605 and UE 610 may perform wireless communications over the subset of slots based at least in part on the first SFI and the second SFI. For example, UE 610 may identify a communication direction for at least some of the symbols in the subset of slots based on the first and second SFIs and perform the wireless communications based on the identified communication direction. In some aspects, this may include UE 610 determining that the first SFI indicates an unknown (X) communication direction for symbol(s) within the subset of slots. In this instance, UE 610 may use the second SFI to identify the communication direction for those symbols(s).

Figure 7:
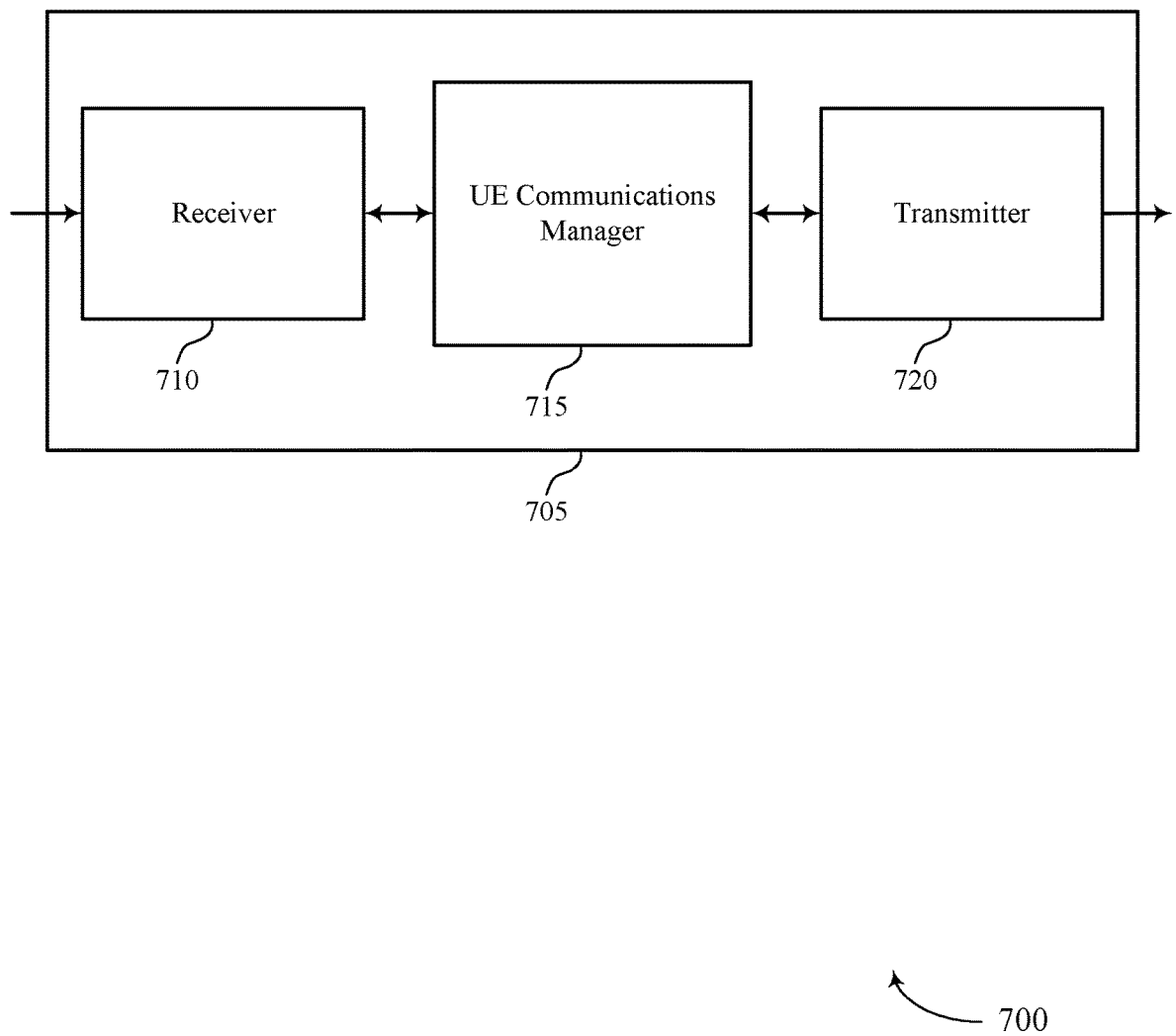
FIGS. 7 and 8 show block diagrams of wireless devices that support multi-level SFI in accordance with aspects of the present disclosure.

FIG. 7 shows a block diagram 700 of a wireless device 705 that supports multi-level SFI in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to multi-level SFI, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10.

UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

UE communications manager 715 may receive a first SFI during a first monitoring period for a set of slots associated with the first monitoring period, receive a second SFI during a second monitoring period that is shorter in duration than the first monitoring period and occurs within the first monitoring period, the second SFI including an indication of slot formats for a subset of the slots associated with the second monitoring period, and perform wireless communications over the subset of slots based on the first SFI and the second SFI.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
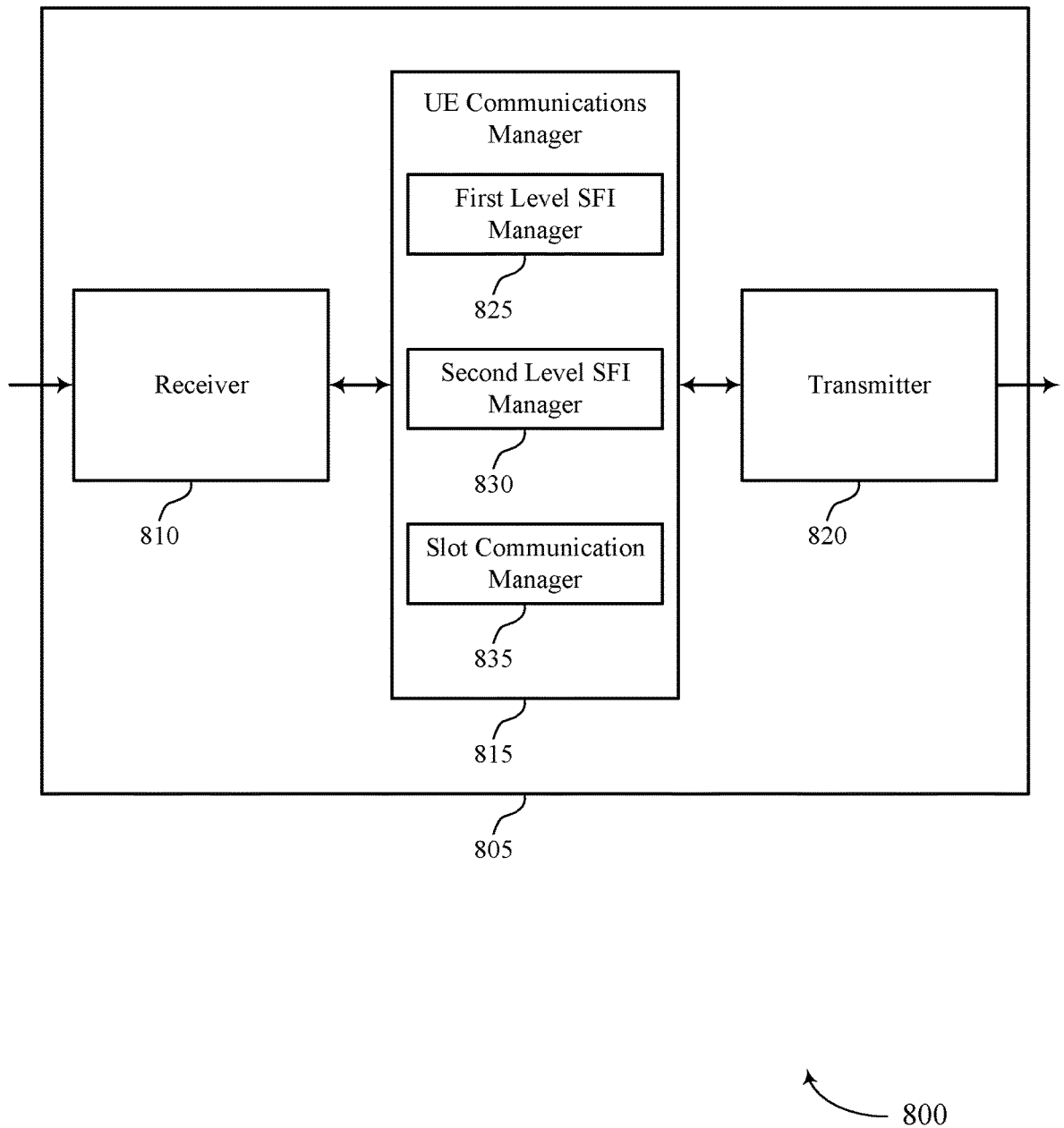

FIG. 8 shows a block diagram 800 of a wireless device 805 that supports multi-level SFI in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to multi-level SFI, etc.). Information may be passed on to other components of the device. The receiver 810 may be an example of aspects of the transceiver 1035 described with reference to FIG. 10. The receiver 810 may utilize a single antenna or a set of antennas.

UE communications manager 815 may be an example of aspects of the UE communications manager 1015 described with reference to FIG. 10. UE communications manager 815 may also include first level SFI manager 825, second level SFI manager 830, and slot communication manager 835. First level SFI manager 825 may receive a first SFI during a first monitoring period for a set of slots associated with the first monitoring period.

Second level SFI manager 830 may receive a second SFI during a second monitoring period that is shorter in duration than the first monitoring period and occurs within the first monitoring period, the second SFI including an indication of slot formats for a subset of the slots associated with the second monitoring period.

Slot communication manager 835 may perform wireless communications over the subset of slots based on the first SFI and the second SFI. In some cases, the first monitoring period is for a TxOP and the second monitoring period is for the one or more slots occurring within the TxOP. In some cases, the subset of slots includes one slot or more than one slot.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
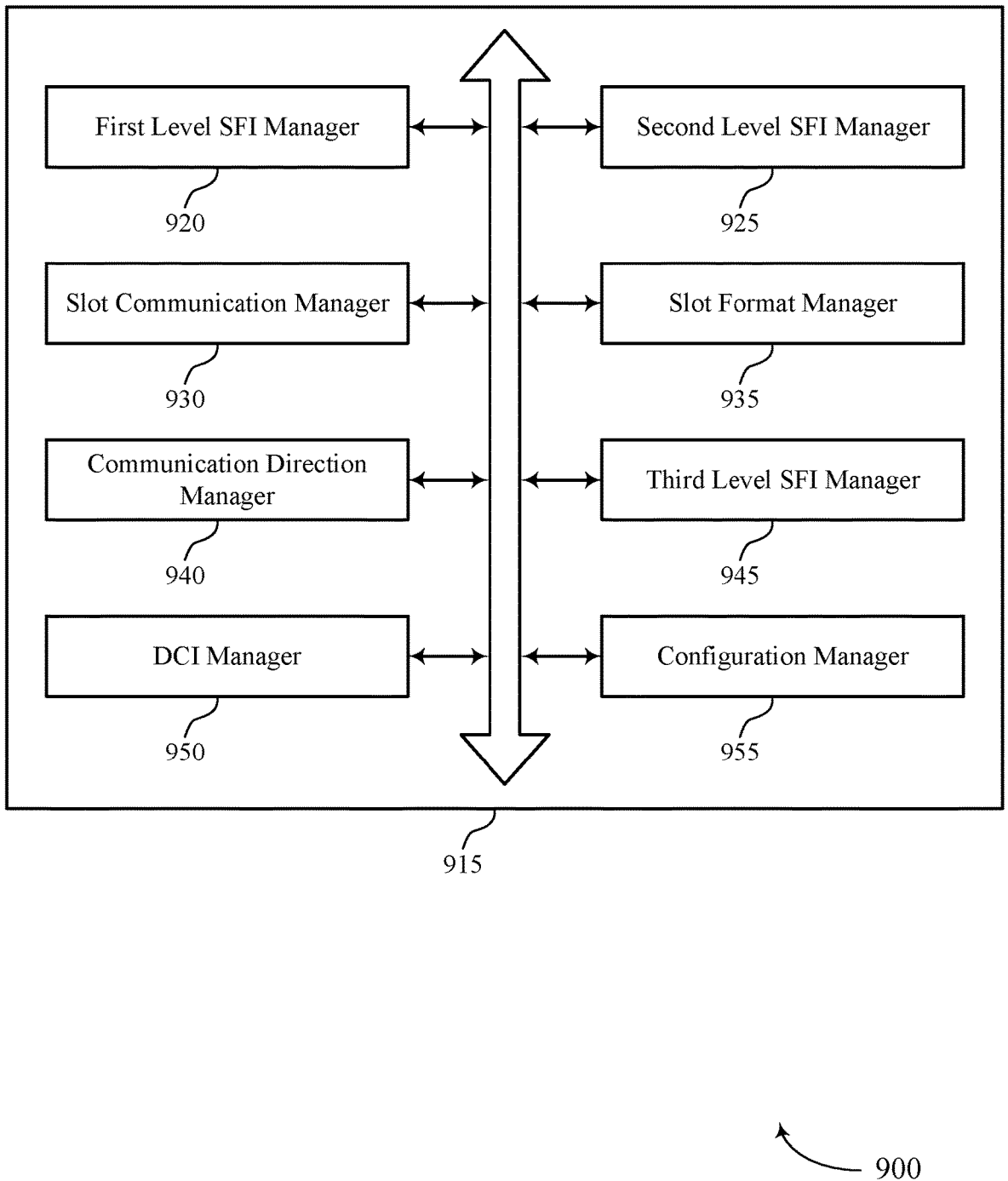
FIG. 9 shows a block diagram of a user equipment (UE) communications manager that supports multi-level SFI in accordance with aspects of the present disclosure

FIG. 9 shows a block diagram 900 of a UE communications manager 915 that supports multi-level SFI in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include first level SFI manager 920, second level SFI manager 925, slot communication manager 930, slot format manager 935, communication direction manager 940, third level SFI manager 945, DCI manager 950, and configuration manager 955. Each of these modules may communicate, directly or indirectly, with one another (e.g., via one or more buses).

First level SFI manager 920 may receive a first SFI during a first monitoring period for a set of slots associated with the first monitoring period.

Second level SFI manager 925 may receive a second SFI during a second monitoring period that is shorter in duration than the first monitoring period and occurs within the first monitoring period, the second SFI including an indication of slot formats for a subset of the slots associated with the second monitoring period.

Slot communication manager 930 may perform wireless communications over the subset of slots based on the first SFI and the second SFI. In some cases, the first monitoring period is for a TxOP and the second monitoring period is for the one or more slots occurring within the TxOP. In some cases, the subset of slots includes one slot or more than one slot.

Slot format manager 935 may perform the wireless communications over the subset of slots based on the identified communication direction and where the first SFI includes control information identifying and indicating configuration information for the subset of slots, the identifying configuration information including identifying a slot format for the subset of slots based at least in part on the second SFI. In some cases, performing the wireless communications includes: identifying a communication direction for at least a portion of the symbols in the subset of slots based on the first SFI and the second SFI. In some cases, the control information includes one or more of an indication of RACH resources, a frame format indication, or a combination thereof.

Communication direction manager 940 may determine that the first SFI indicates a flexible communication direction for one or more symbols within the subset of slots and identify a communication direction for each of the one or more symbols based on the second SFI.

Third level SFI manager 945 may receive a third SFI during a third monitoring period that is shorter in duration than the second monitoring period and occurs with the second monitoring period, the third SFI including an indication of a slot format for a slot associated with the third monitoring period. In some cases, the first monitoring period is for a DMTC window, the second monitoring period is for a TxOP occurring within the DMTC window, and the third monitoring period is for the slot occurring within the TxOP.

DCI manager 950 may receive the first SFI in a first DCI field, receive the second SFI in a second DCI field that is different from the first DCI field, receive the first SFI and the second SFI in a common DCI field, and perform at least one of joint interpretation or deconcatenation on the common DCI field to determine the first SFI, the second SFI, or a combination.

Configuration manager 955 may receive a configuration message indicating the first monitoring period and the second monitoring period.

Figure 10:
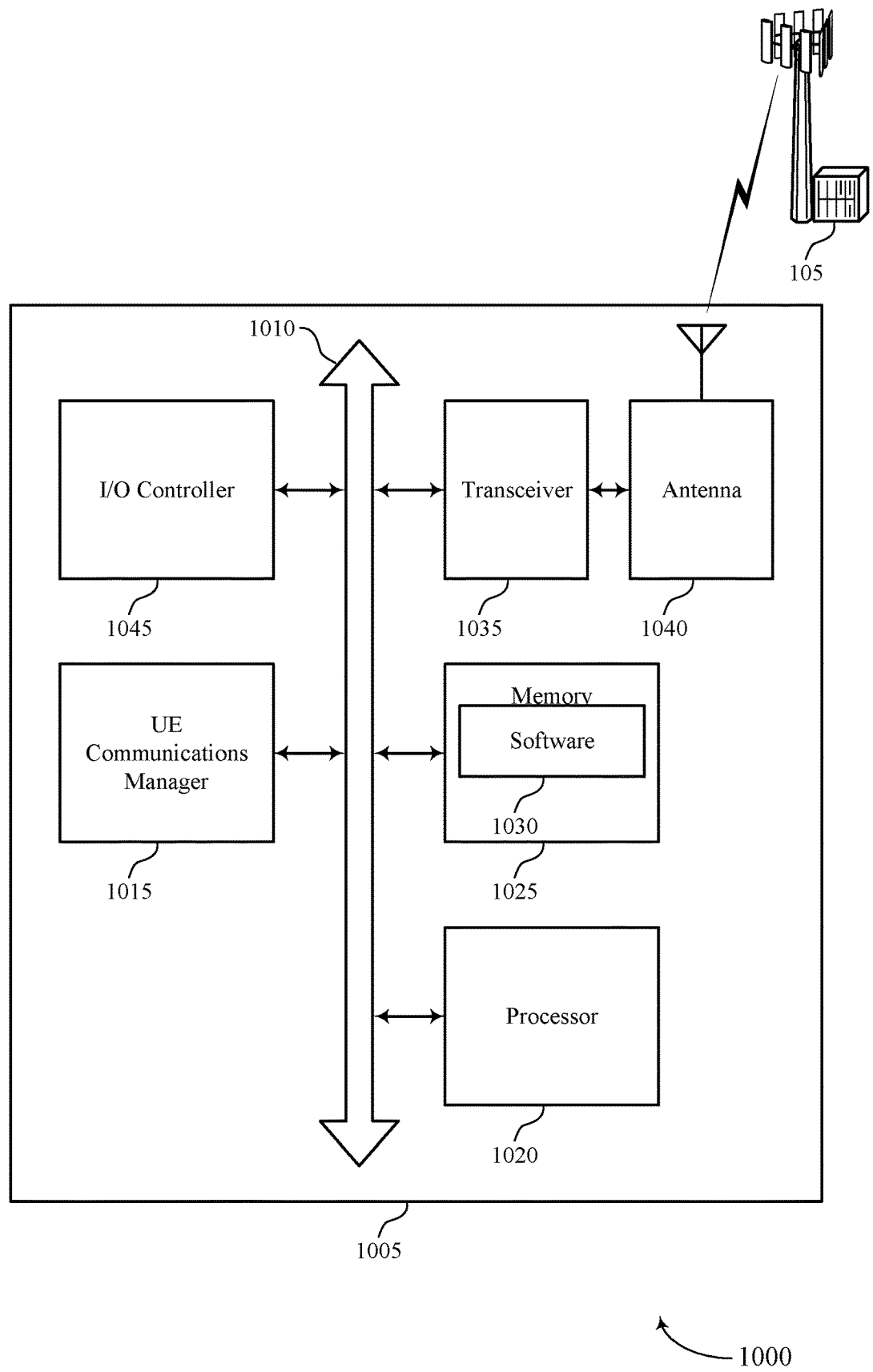
FIG. 10 illustrates a block diagram of a system including a device that supports multi-level SFI in accordance with aspects of the present disclosure.

FIG. 10 shows a block diagram of a system 1000 including a device 1005 that supports multi-level SFI in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting multi-level SFI).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support multi-level SFI. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
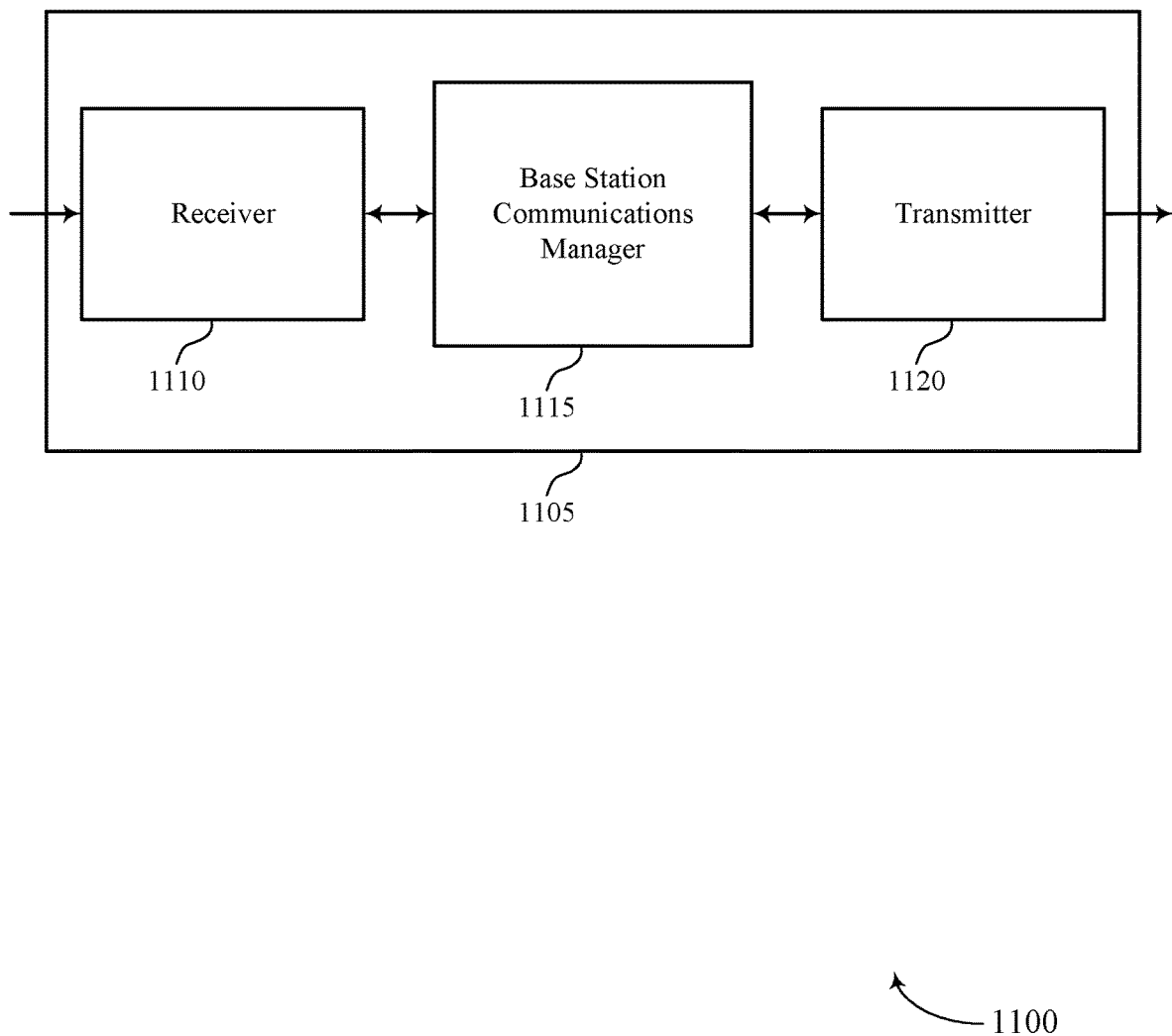
FIGS. 11 and 12 show block diagrams of wireless devices that support multi-level SFI in accordance with aspects of the present disclosure.

FIG. 11 shows a block diagram 1100 of a wireless device 1105 that supports multi-level SFI in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to multi-level SFI, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14.

Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with aspects of the present disclosure.

Base station communications manager 1115 may transmit a first SFI during a first monitoring period for a set of slots associated with the first monitoring period, transmit a second SFI during a second monitoring period that is shorter in duration than the first monitoring period and occurs within the first monitoring period, the second SFI including an indication of slot formats for a subset of the slots associated with the second monitoring period, and perform wireless communications over the subset of slots based on the first SFI and the second SFI.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
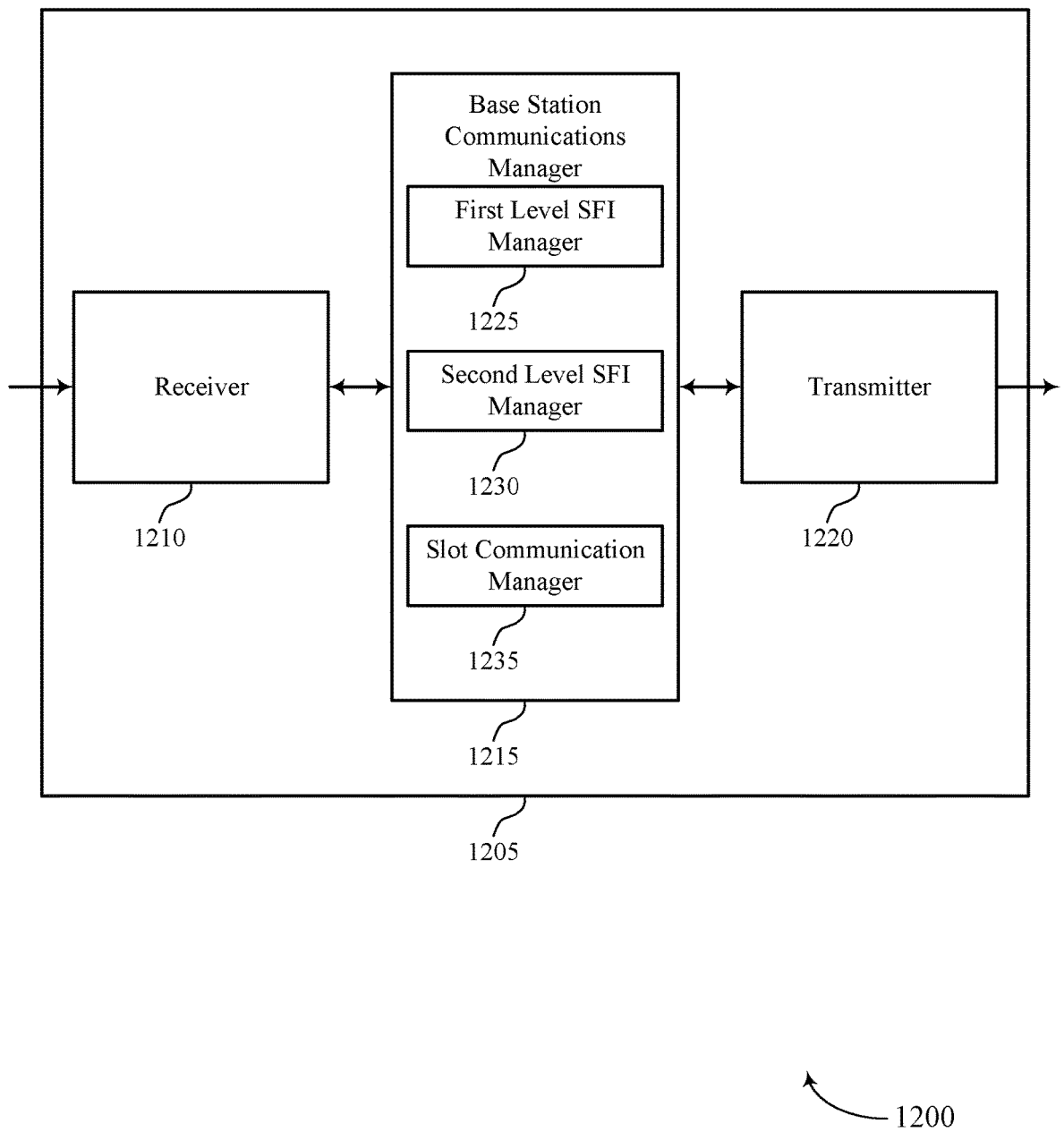

FIG. 12 shows a block diagram 1200 of a wireless device 1205 that supports multi-level SFI in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to multi-level SFI, etc.). Information may be passed on to other components of the device. The receiver 1210 may be an example of aspects of the transceiver 1435 described with reference to FIG. 14. The receiver 1210 may utilize a single antenna or a set of antennas.

Base station communications manager 1215 may be an example of aspects of the base station communications manager 1415 described with reference to FIG. 14.

Base station communications manager 1215 may also include first level SFI manager 1225, second level SFI manager 1230, and slot communication manager 1235.

First level SFI manager 1225 may transmit a first SFI during a first monitoring period for a set of slots associated with the first monitoring period.

Second level SFI manager 1230 may transmit a second SFI during a second monitoring period that is shorter in duration than the first monitoring period and occurs within the first monitoring period, the second SFI including an indication of slot formats for a subset of the slots associated with the second monitoring period.

Slot communication manager 1235 may perform wireless communications over the subset of slots based on the first SFI and the second SFI.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
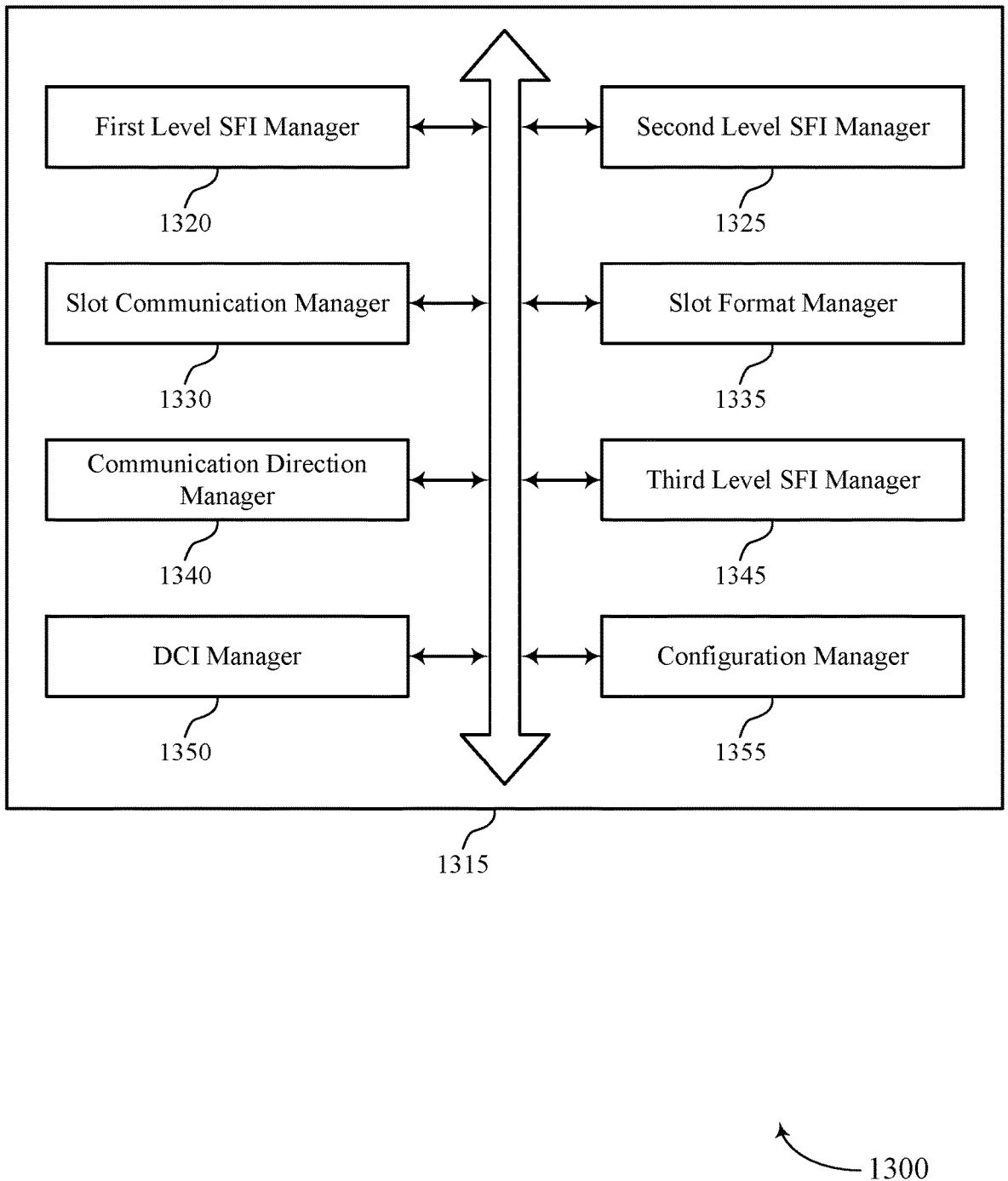
FIG. 13 shows a block diagram of a base station communications manager that supports multi-level SFI in accordance with aspects of the present disclosure.

FIG. 13 shows a block diagram 1300 of a base station communications manager 1315 that supports multi-level SFI in accordance with aspects of the present disclosure. The base station communications manager 1315 may be an example of aspects of a base station communications manager 1415 described with reference to FIGS. 11, 12, and 14. The base station communications manager 1315 may include first level SFI manager 1320, second level SFI manager 1325, slot communication manager 1330, slot format manager 1335, communication direction manager 1340, third level SFI manager 1345, DCI manager 1350, and configuration manager 1355. Each of these modules may communicate, directly or indirectly, with one another (e.g., via one or more buses).

First level SFI manager 1320 may transmit a first SFI during a first monitoring period for a set of slots associated with the first monitoring period.

Second level SFI manager 1325 may transmit a second SFI during a second monitoring period that is shorter in duration than the first monitoring period and occurs within the first monitoring period, the second SFI including an indication of slot formats for a subset of the slots associated with the second monitoring period.

Slot communication manager 1330 may perform wireless communications over the subset of slots based on the first SFI and the second SFI.

Slot format manager 1335 may perform the wireless communications over the subset of slots based on the identified communication direction, configure the first SFI to include control information identifying and indicating configuration information for the subset of slots, and configure the second SFI to indicate a slot format for the subset of slots. In some cases, performing the wireless communications includes: identifying a communication direction for at least a portion of the symbols in the subset of slots based on the first SFI and the second SFI.

Communication direction manager 1340 may determine that the first SFI indicates a flexible communication direction for one or more symbols within the subset of slots and configure the second SFI to indicate a communication direction for each of the one or more symbols.

Third level SFI manager 1345 may transmit a third SFI during a third monitoring period that is shorter in duration than the second monitoring period and occurs with the second monitoring period, the third SFI including an indication of a slot format for a slot associated with the third monitoring period. In some cases, the first monitoring period is for a DMTC window, the second monitoring period is for a TxOP occurring within the DMTC window, and the third monitoring period is for the slot occurring within the TxOP.

DCI manager 1350 may transmit the first SFI in a first DCI field, transmit the second SFI in a second DCI field that is different from the first DCI field, perform at least one of joint encoding or concatenation on a common DCI field to transmit the first SFI and the second SFI, and transmit the common DCI field to indicate the first SFI and the second SFI.

Configuration manager 1355 may transmit a configuration message indicating the first monitoring period and the second monitoring period.

Figure 14:
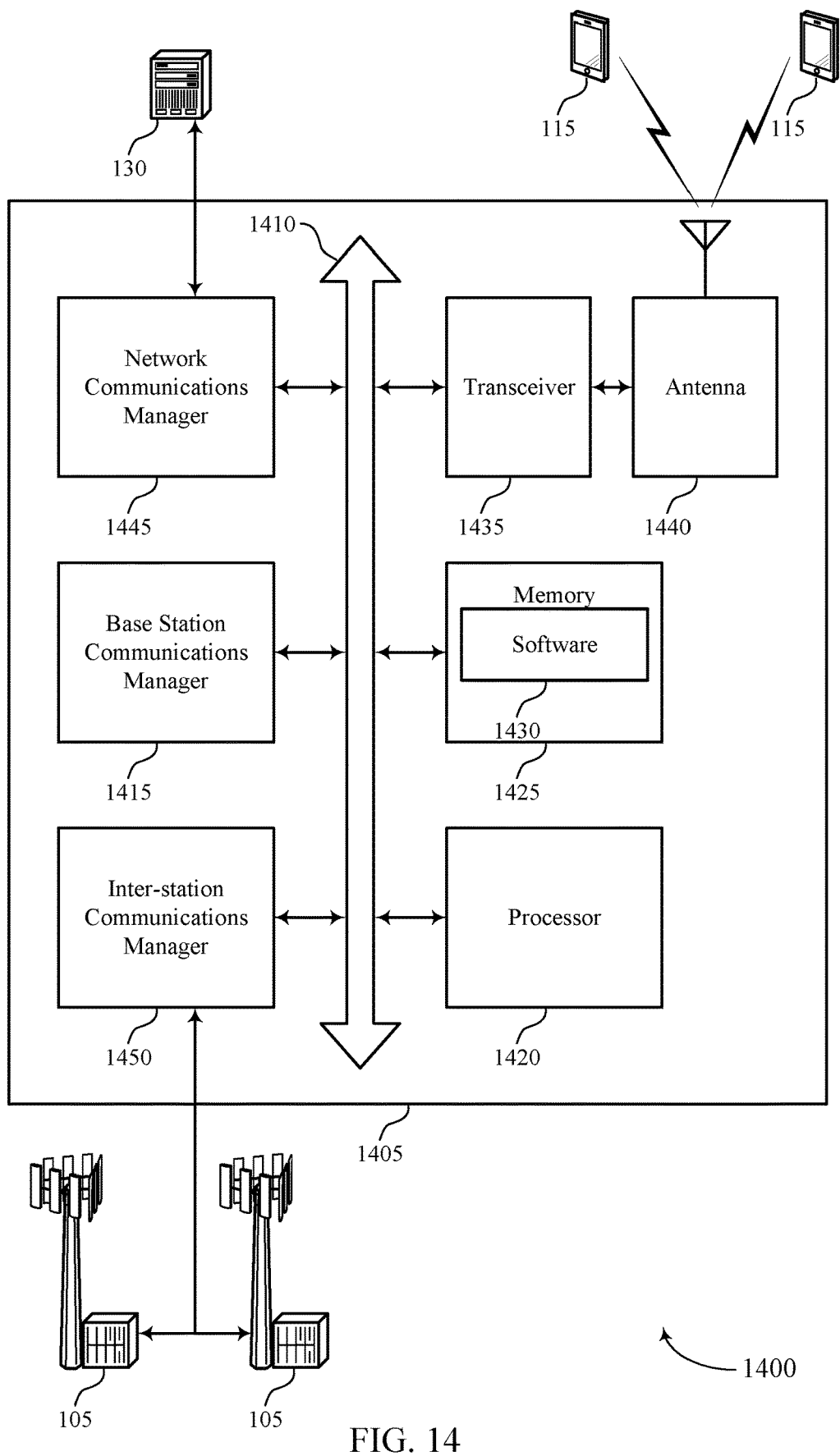
FIG. 14 illustrates a block diagram of a system including a device that supports multi-level SFI in accordance with aspects of the present disclosure.

FIG. 14 shows a block diagram of a system 1400 including a device 1405 that supports multi-level SFI in accordance with aspects of the present disclosure. Device 1405 may be an example of or include the components of base station 105 as described above, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting multi-level SFI).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support multi-level SFI. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an LTE/LTE-A wireless communication network technology to provide communication between base stations 105.

Figure 15:
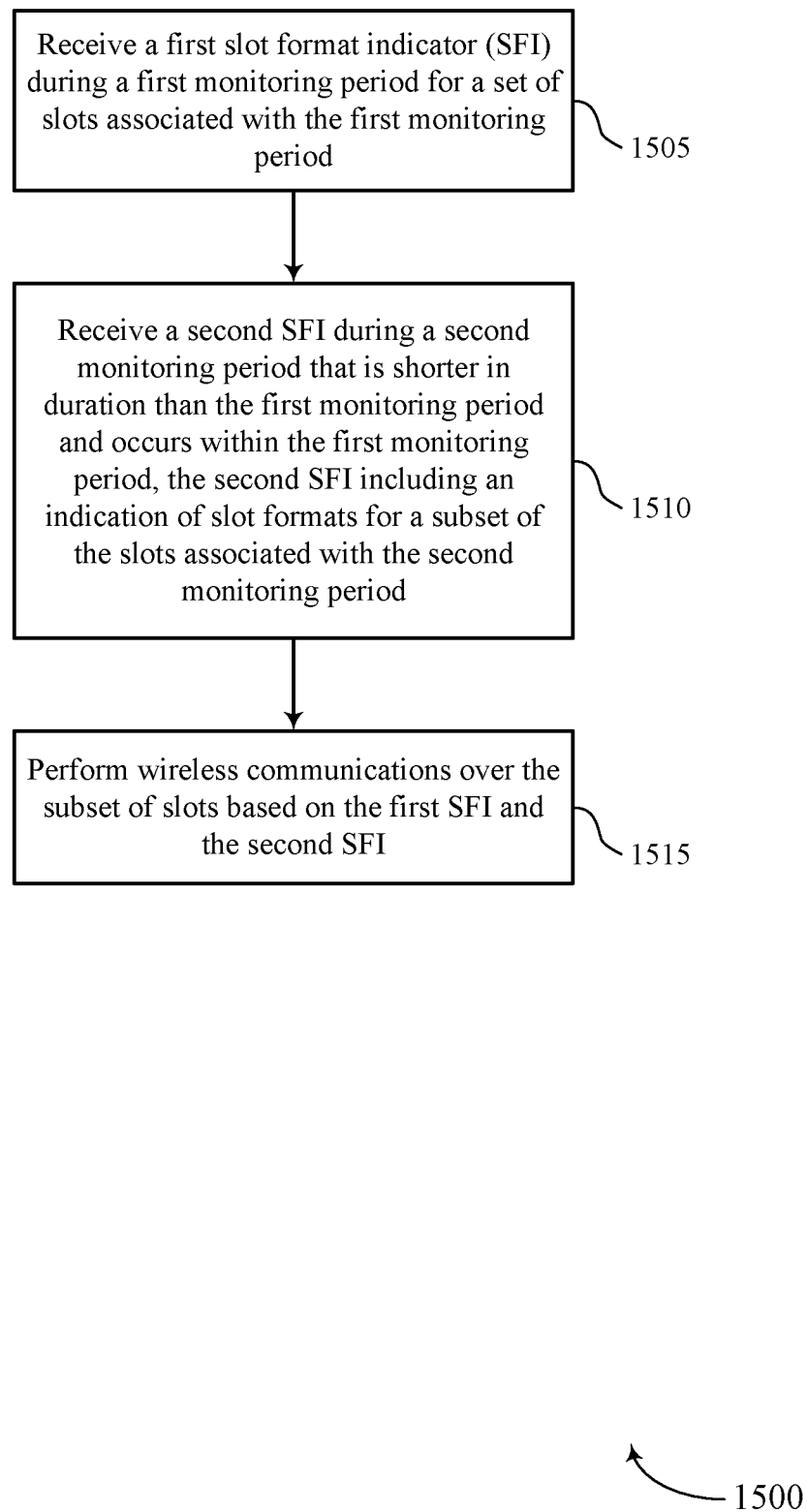
FIGS. 15 through 18 show flowcharts illustrating methods for multi-level SFI in accordance with aspects of the present disclosure.

FIG. 15 shows a flowchart illustrating a method 1500 for multi-level SFI in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may receive a first SFI during a first monitoring period for a set of slots associated with the first monitoring period. The operations of 1505 may be performed according to the methods described herein. In certain examples, aspects of the operations of 1505 may be performed by a first level SFI manager as described with reference to FIGS. 7 through 10.

At 1510 the UE 115 may receive a second SFI during a second monitoring period that is shorter in duration than the first monitoring period and occurs within the first monitoring period, the second SFI comprising an indication of slot formats for a subset of the slots associated with the second monitoring period. The operations of 1510 may be performed according to the methods described herein. In certain examples, aspects of the operations of 1510 may be performed by a second level SFI manager as described with reference to FIGS. 7 through 10.

At 1515 the UE 115 may perform wireless communications over the subset of slots based at least in part on the first SFI and the second SFI. The operations of 1515 may be performed according to the methods described herein. In certain examples, aspects of the operations of 1515 may be performed by a slot communication manager as described with reference to FIGS. 7 through 10.

Figure 16:
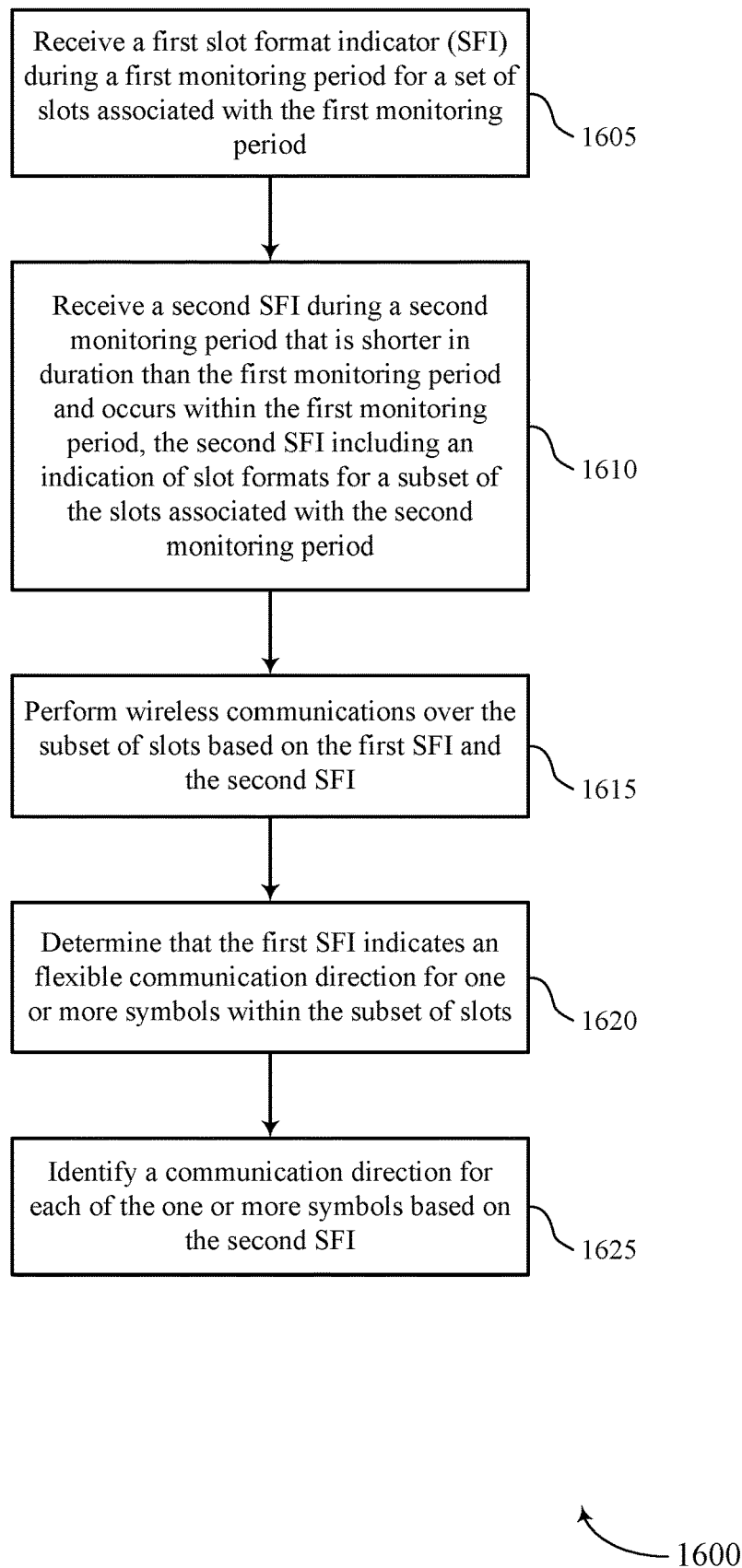

FIG. 16 shows a flowchart illustrating a method 1600 for multi-level SFI in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may receive a first SFI during a first monitoring period for a set of slots associated with the first monitoring period. The operations of 1605 may be performed according to the methods described herein. In certain examples, aspects of the operations of 1605 may be performed by a first level SFI manager as described with reference to FIGS. 7 through 10.

At 1610 the UE 115 may receive a second SFI during a second monitoring period that is shorter in duration than the first monitoring period and occurs within the first monitoring period, the second SFI comprising an indication of slot formats for a subset of the slots associated with the second monitoring period. The operations of 1610 may be performed according to the methods described herein. In certain examples, aspects of the operations of 1610 may be performed by a second level SFI manager as described with reference to FIGS. 7 through 10.

At 1615 the UE 115 may perform wireless communications over the subset of slots based at least in part on the first SFI and the second SFI. The operations of 1615 may be performed according to the methods described herein. In certain examples, aspects of the operations of 1615 may be performed by a slot communication manager as described with reference to FIGS. 7 through 10.

At 1620 the UE 115 may determine that the first SFI indicates a flexible communication direction for one or more symbols within the subset of slots. The operations of 1620 may be performed according to the methods described herein. In certain examples, aspects of the operations of 1620 may be performed by a communication direction manager as described with reference to FIGS. 7 through 10.

At 1625 the UE 115 may identify a communication direction for each of the one or more symbols based at least in part on the second SFI. The operations of 1625 may be performed according to the methods described herein. In certain examples, aspects of the operations of 1625 may be performed by a communication direction manager as described with reference to FIGS. 7 through 10.

Figure 17:
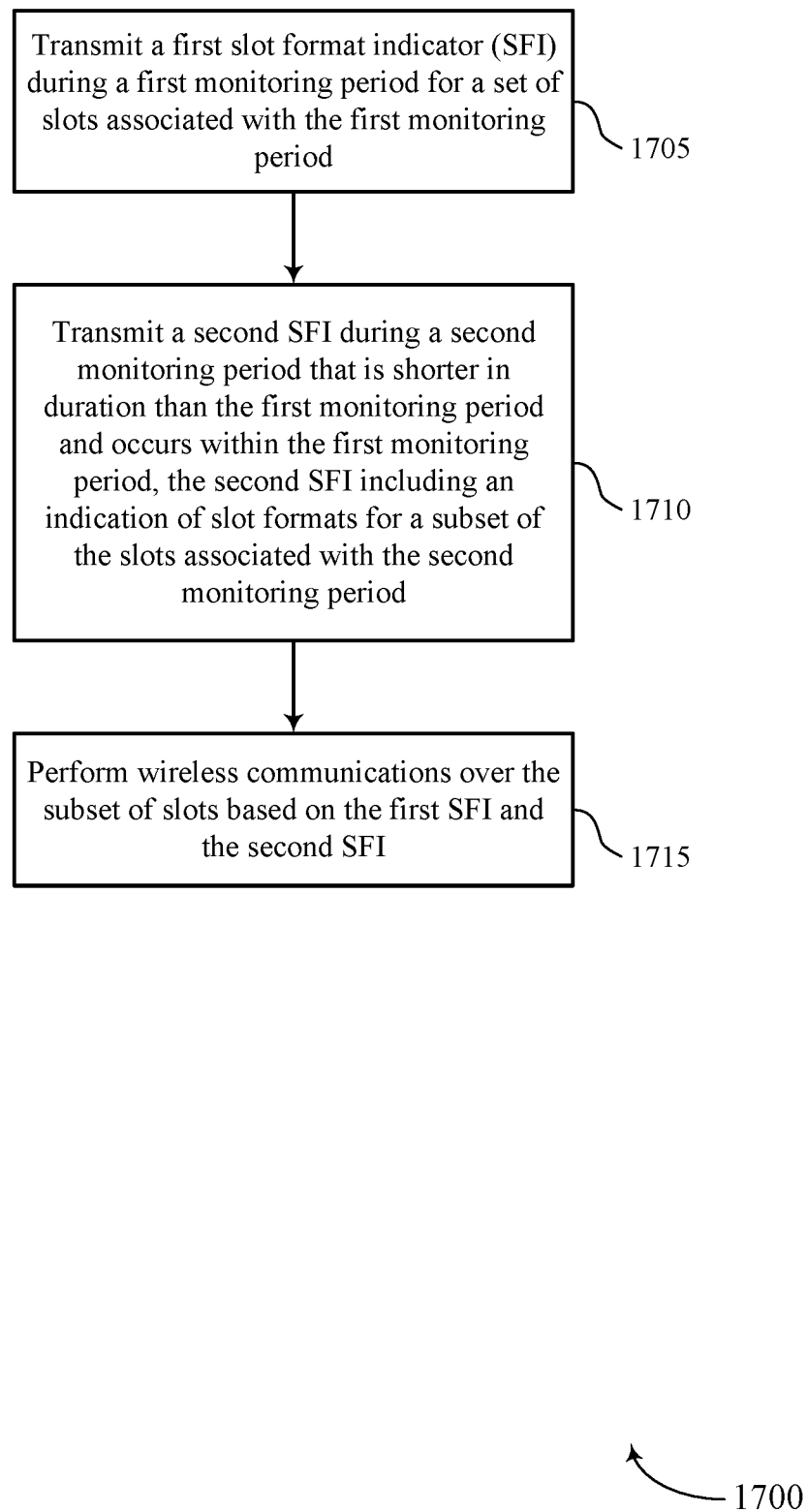

FIG. 17 shows a flowchart illustrating a method 1700 for multi-level SFI in accordance with aspects of the present disclosure. The operations of method 1700 may be implemented by a base station 105 or its components as described herein. For example, the operations of method 1700 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may transmit a first SFI during a first monitoring period for a set of slots associated with the first monitoring period. The operations of 1705 may be performed according to the methods described herein. In certain examples, aspects of the operations of 1705 may be performed by a first level SFI manager as described with reference to FIGS. 11 through 14.

At 1710 the base station 105 may transmit a second SFI during a second monitoring period that is shorter in duration than the first monitoring period and occurs within the first monitoring period, the second SFI comprising an indication of slot formats for a subset of the slots associated with the second monitoring period. The operations of 1710 may be performed according to the methods described herein. In certain examples, aspects of the operations of 1710 may be performed by a second level SFI manager as described with reference to FIGS. 11 through 14.

At 1715 the base station 105 may perform wireless communications over the subset of slots based at least in part on the first SFI and the second SFI. The operations of 1715 may be performed according to the methods described herein. In certain examples, aspects of the operations of 1715 may be performed by a slot communication manager as described with reference to FIGS. 11 through 14.

Figure 18:
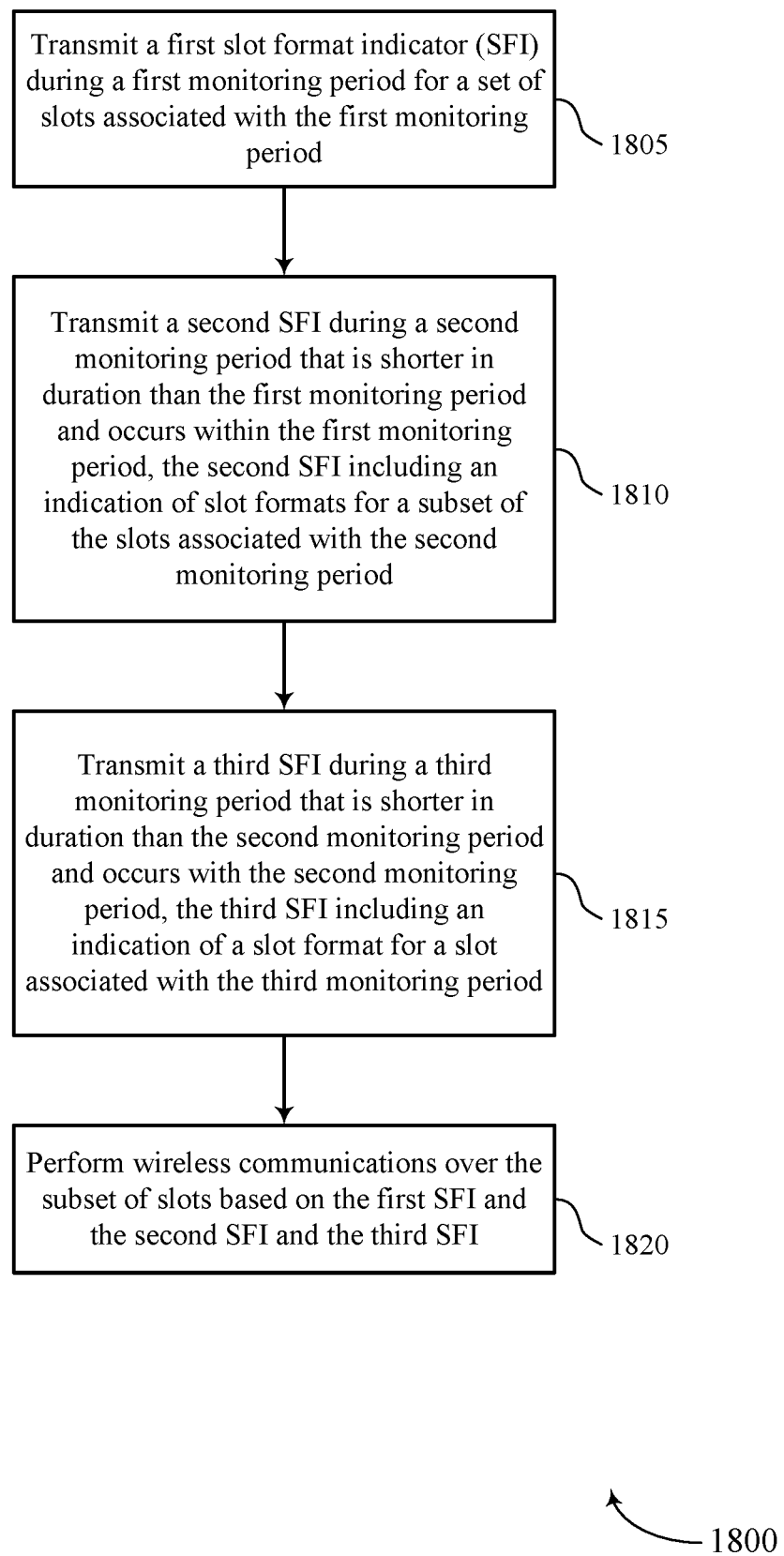

FIG. 18 shows a flowchart illustrating a method 1800 for multi-level SFI in accordance with aspects of the present disclosure. The operations of method 1800 may be implemented by a base station 105 or its components as described herein. For example, the operations of method 1800 may be performed by a base station communications manager as described with reference to FIGS. 11 through 14. In some examples, a base station 105 may execute a set of codes to control the functional elements of the device to perform the functions described below. Additionally or alternatively, the base station 105 may perform aspects of the functions described below using special-purpose hardware.

At 1805 the base station 105 may transmit a first SFI during a first monitoring period for a set of slots associated with the first monitoring period. The operations of 1805 may be performed according to the methods described herein. In certain examples, aspects of the operations of 1805 may be performed by a first level SFI manager as described with reference to FIGS. 11 through 14.

At 1810 the base station 105 may transmit a second SFI during a second monitoring period that is shorter in duration than the first monitoring period and occurs within the first monitoring period, the second SFI comprising an indication of slot formats for a subset of the slots associated with the second monitoring period. The operations of 1810 may be performed according to the methods described herein. In certain examples, aspects of the operations of 1810 may be performed by a second level SFI manager as described with reference to FIGS. 11 through 14.

At 1815 the base station 105 may transmit a third SFI during a third monitoring period that is shorter in duration than the second monitoring period and occurs with the second monitoring period, the third SFI comprising an indication of a slot format for a slot associated with the third monitoring period. The operations of 1815 may be performed according to the methods described herein. In certain examples, aspects of the operations of 1815 may be performed by a third level SFI manager as described with reference to FIGS. 11 through 14.

At 1820 the base station 105 may perform wireless communications over the subset of slots based at least in part on the first SFI and the second SFI. The operations of 1820 may be performed according to the methods described herein. In certain examples, aspects of the operations of 1820 may be performed by a slot communication manager as described with reference to FIGS. 11 through 14.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code-division multiple access (CDMA), time-division multiple access (TDMA), frequency-division multiple access (FDMA), orthogonal frequency-division multiple access (OFDMA), single carrier frequency-division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving a first slot format indicator (SFI) during a first monitoring period for a set of slots associated with the first monitoring period;
   receiving a second SFI during a second monitoring period that is shorter in duration than the first monitoring period and occurs within the first monitoring period, the second SFI comprising an indication of slot formats for a subset of the slots associated with the second monitoring period; and
   performing wireless communications over the subset of slots based at least in part on the first SFI and the second SFI.

2. The method of claim 1, wherein performing the wireless communications comprises:
   identifying a communication direction for at least a portion of the symbols in the subset of slots based at least in part on the first SFI and the second SFI; and
   performing the wireless communications over the subset of slots based at least in part on the identified communication direction.

3. The method of claim 1, further comprising:
   determining that the first SFI indicates a flexible communication direction for one or more symbols within the subset of slots; and
   identifying a communication direction for each of the one or more symbols based at least in part on the second SFI.

4. The method of claim 1, wherein the first SFI comprises control information identifying and indicating configuration information for the subset of slots, the identifying configuration information comprising identifying a slot format for the subset of slots based at least in part on the second SFI.

5. The method of claim 4, wherein the control information comprises one or more of an indication of random access channel (RACH) resources, a frame format indication, or a combination thereof.

6. The method of claim 1, further comprising:
   receiving a third SFI during a third monitoring period that is shorter in duration than the second monitoring period and occurs with the second monitoring period, the third SFI comprising an indication of a slot format for a slot associated with the third monitoring period.

7. The method of claim 6, wherein the first monitoring period is for a discovery reference signal (DRS) measurement timing configuration (DMTC) window, the second monitoring period is for a transmission opportunity (TxOP) occurring within the DMTC window, and the third monitoring period is for the slot occurring within the TxOP.

8. The method of claim 1, further comprising:
receiving the first SFI in a first downlink control indicator (DCI) field; and
receiving the second SFI in a second DCI field that is different from the first DCI field.

9. The method of claim 1, further comprising:
receiving the first SFI and the second SFI in a common downlink control indicator (DCI) field; and
performing at least one of joint interpretation or deconcatenation on the common DCI field to determine the first SFI, the second SFI, or a combination thereof.

10. The method of claim 1, further comprising:
receiving a configuration message indicating the first monitoring period and the second monitoring period.

11. The method of claim 1, wherein the first monitoring period is for a transmission opportunity (TxOP) and the second monitoring period is for the one or more slots occurring within the TxOP.

12. The method of claim 1, wherein the subset of slots comprises one slot or more than one slot.

13. A method for wireless communication, comprising:
transmitting a first slot format indicator (SFI) during a first monitoring period for a set of slots associated with the first monitoring period;
transmitting a second SFI during a second monitoring period that is shorter in duration than the first monitoring period and occurs within the first monitoring period, the second SFI comprising an indication of slot formats for a subset of the slots associated with the second monitoring period; and
performing wireless communications over the subset of slots based at least in part on the first SFI and the second SFI.

14. The method of claim 13, wherein performing the wireless communications comprises:
identifying a communication direction for at least a portion of the symbols in the subset of slots based at least in part on the first SFI and the second SFI; and
performing the wireless communications over the subset of slots based at least in part on the identified communication direction.

15. The method of claim 13, further comprising:
determining that the first SFI indicates a flexible communication direction for one or more symbols within the subset of slots; and
configuring the second SFI to indicate a communication direction for each of the one or more symbols.

16. The method of claim 13, further comprising:
configuring the first SFI to comprise control information identifying and indicating configuration information for the subset of slots; and
configuring the second SFI to indicate a slot format for the subset of slots.

17. The method of claim 13, further comprising:
transmitting a third SFI during a third monitoring period that is shorter in duration than the second monitoring period and occurs with the second monitoring period, the third SFI comprising an indication of a slot format for a slot associated with the third monitoring period.

18. The method of claim 17, wherein the first monitoring period is for a discovery reference signal (DRS) measurement timing configuration (DMTC) window, the second monitoring period is for a transmission opportunity (TxOP) occurring within the DMTC window, and the third monitoring period is for the slot occurring within the TxOP.

19. The method of claim 13, further comprising:
transmitting the first SFI in a first downlink control indicator (DCI) field; and
transmitting the second SFI in a second DCI field that is different from the first DCI field.

20. The method of claim 13, further comprising:
performing at least one of joint encoding or concatenation on a common downlink control indicator (DCI) field to transmit the first SFI and the second SFI; and
transmitting the common DCI field to indicate the first SFI and the second SFI.

21. The method of claim 13, further comprising:
transmitting a configuration message indicating the first monitoring period and the second monitoring period.

22. An apparatus for wireless communication, comprising:
a processor;
memory in electronic communication with the processor; and
instructions stored in the memory, wherein the instructions are executable by the processor to:
receive a first slot format indicator (SFI) during a first monitoring period for a set of slots associated with the first monitoring period;
receive a second SFI during a second monitoring period that is shorter in duration than the first monitoring period and occurs within the first monitoring period, the second SFI comprising an indication of slot formats for a subset of the slots associated with the second monitoring period; and
perform wireless communications over the subset of slots based at least in part on the first SFI and the second SFI.

23. The apparatus of claim 22, wherein the instructions executable by the processor to perform the wireless communications comprise instructions executable by the processor to:
identify a communication direction for at least a portion of the symbols in the subset of slots based at least in part on the first SFI and the second SFI; and
perform the wireless communications over the subset of slots based at least in part on the identified communication direction.

24. The apparatus of claim 22, wherein the instructions are further executable by the processor to:
determine that the first SFI indicates a flexible communication direction for one or more symbols within the subset of slots; and
identify a communication direction for each of the one or more symbols based at least in part on the second SFI.

25. The apparatus of claim 22, wherein the first SFI comprises control information identifying and indicating configuration information for the subset of slots, wherein the instructions are further executable by the processor to:
identify a slot format for the subset of slots based at least in part on the second SFI.

26. An apparatus for wireless communication, comprising:
a processor;
memory in electronic communication with the processor; and instructions stored in the memory, wherein the instructions are executable by the processor to:
    transmit a first slot format indicator (SFI) during a first monitoring period for a set of slots associated with the first monitoring period;
    transmit a second SFI during a second monitoring period that is shorter in duration than the first monitoring period and occurs within the first monitoring period, the second SFI comprising an indication of slot formats for a subset of the slots associated with the second monitoring period; and
    perform wireless communications over the subset of slots based at least in part on the first SFI and the second SFI.

27. The apparatus of claim 26, wherein the instructions executable by the processor to perform the wireless communications comprise instructions executable by the processor to:
    identify a communication direction for at least a portion of the symbols in the subset of slots based at least in part on the first SFI and the second SFI; and
    perform the wireless communications over the subset of slots based at least in part on the identified communication direction.

28. The apparatus of claim 26, wherein the instructions are further executable by the processor to:
    determine that the first SFI indicates a flexible communication direction for one or more symbols within the subset of slots; and
    configure the second SFI to indicate a communication direction for each of the one or more symbols.

29. The apparatus of claim 26, wherein the instructions are further executable by the processor to:
    configure the first SFI to comprise control information identifying and indicating configuration information for the subset of slots; and
    configure the second SFI to indicate a slot format for the subset of slots.

30. The apparatus of claim 26, wherein the instructions are further executable by the processor to:
    transmit a third SFI during a third monitoring period that is shorter in duration than the second monitoring period and occurs with the second monitoring period, the third SFI comprising an indication of a slot format for a slot associated with the third monitoring period.

* * * * *